(12) United States Patent
Aurongzeb et al.

(10) Patent No.: US 12,235,752 B2
(45) Date of Patent: Feb. 25, 2025

(54) SYSTEM AND METHOD FOR DEVELOPING GREEN DATA CENTER POLICIES TO MINIMIZE CO2 GENERATED DURING EXECUTION OF TEST SUITES ON A PER SOFTWARE FEATURE TESTING BASIS

(71) Applicant: Dell Products, LP, Round Rock, TX (US)

(72) Inventors: Deeder M. Aurongzeb, Austin, TX (US); Ramesh Doddaiah, West Borough, MA (US); Malathi Ramakrishnan, Tamil Nadu (IN)

(73) Assignee: DELL PRODUCTS LP, Round Rock, TX (US)

( * ) Notice: Subject to any disclaimer, the term of this patent is extended or adjusted under 35 U.S.C. 154(b) by 184 days.

(21) Appl. No.: 18/142,690

(22) Filed: May 3, 2023

(65) Prior Publication Data
US 2024/0370357 A1     Nov. 7, 2024

(51) Int. Cl.
G06F 11/36        (2006.01)
G06F 11/3668      (2025.01)

(52) U.S. Cl.
CPC ...... *G06F 11/3688* (2013.01); *G06F 11/3684* (2013.01)

(58) Field of Classification Search
None
See application file for complete search history.

(56) References Cited

U.S. PATENT DOCUMENTS

| 8,185,909 B2 | 5/2012 | Sigal |
| 8,626,450 B2 | 1/2014 | Dooley |
| 9,183,327 B2 | 11/2015 | Keeli |

(Continued)

FOREIGN PATENT DOCUMENTS

| EP | 2006770 B1 | 1/2014 |
| WO | 2011/106160 A2 | 9/2011 |

OTHER PUBLICATIONS

C. Herrmann, et al., "Sustainability as Strategic Business Model for Profitable Business," 7 pages, May 2014.

(Continued)

*Primary Examiner* — Ryan D. Coyer
(74) *Attorney, Agent, or Firm* — Prol Intellectual Property Law, PLLC; H. Kenneth Prol

(57) ABSTRACT

An information handling system executing a software test suite green data center policy generation system comprising a network interface device receiving data center hardware utilization analytics and a software test suite identifier for a selected software test suit and a processor to identify a reserved capacity of the data center processing system reserved for general execution of software test suites according to general quality of service requirements for input/output commands and to predict a future data center processor utilization rate and execution duration for the selected software test suite by forecasting actual use of data center resources during a future execution of the selected software test suite that is below the reserved capacity, and the network interface device to transmit an instruction to throttle power supplied to an over-allocated portion of the data center resources from the reserved capacity duration execution of the selected software test suite.

20 Claims, 4 Drawing Sheets

(56) References Cited

U.S. PATENT DOCUMENTS

| | | |
|---|---|---|
| 9,760,474 B2 | 9/2017 | Pillai |
| 2004/0024861 A1 | 2/2004 | Coughlin |
| 2008/0046895 A1 | 2/2008 | Dillenberger |
| 2008/0234873 A1* | 9/2008 | Gorbatov ............... G06F 1/206 700/32 |
| 2009/0276388 A1 | 11/2009 | Donohue |
| 2009/0292617 A1 | 11/2009 | Sperling |
| 2010/0070404 A1 | 3/2010 | McConnell |
| 2010/0146336 A1* | 6/2010 | Baughman ............... G06N 3/08 714/E11.029 |
| 2014/0100937 A1 | 4/2014 | Na |
| 2014/0181834 A1 | 6/2014 | Lim |
| 2014/0316964 A1 | 10/2014 | Slutsker |
| 2015/0339159 A1* | 11/2015 | Gupta ................... G06F 9/5094 718/105 |
| 2016/0019084 A1* | 1/2016 | Forestiero ............. G06F 9/5094 718/1 |
| 2016/0286688 A1* | 9/2016 | Wu ................... H05K 7/20772 |
| 2017/0123857 A1 | 5/2017 | Khan |
| 2020/0034171 A1* | 1/2020 | Kommula ............. G06F 9/4893 |
| 2020/0037473 A1* | 1/2020 | Kommula ............ H05K 7/1498 |
| 2021/0004328 A1 | 1/2021 | Wang |
| 2021/0126179 A1* | 4/2021 | Manousakis .......... G06F 1/3203 |
| 2021/0342185 A1* | 11/2021 | Naidu ................... G06F 1/3206 |
| 2022/0108252 A1* | 4/2022 | Narasimhan ........... G06Q 10/30 |
| 2023/0393904 A1* | 12/2023 | Jonnalagadda ....... G06F 9/5094 |

OTHER PUBLICATIONS

A. Stenhall, "What is the carbon footprint of a typical corporate laptop?," 6 pages, Oct. 25, 2020.

K. Abnett, et al., "EU proposes world's first carbon border tax for some imports," 14 pages, Jul. 14, 2021.

\* cited by examiner

SYSTEM AND METHOD FOR DEVELOPING GREEN DATA CENTER POLICIES TO MINIMIZE CO2 GENERATED DURING EXECUTION OF TEST SUITES ON A PER SOFTWARE FEATURE TESTING BASIS

FIELD OF THE DISCLOSURE

The present disclosure generally relates to minimizing an amount of greenhouse gas emissions that may be attributable to operation of a data storage system or data center. More specifically, the present disclosure relates to a software test suite green data center policy generation system for identifying hardware components at a data center that are generally reserved for testing of software but predicted to be underutilized during execution of a particular, identified software testing suite (e.g., testing of a particular software feature) during an upcoming time window and throttling power to the predicted underutilized hardware component(s) in a data center to minimize CO2 emissions due to operation of such underutilized hardware components.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, data centers, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
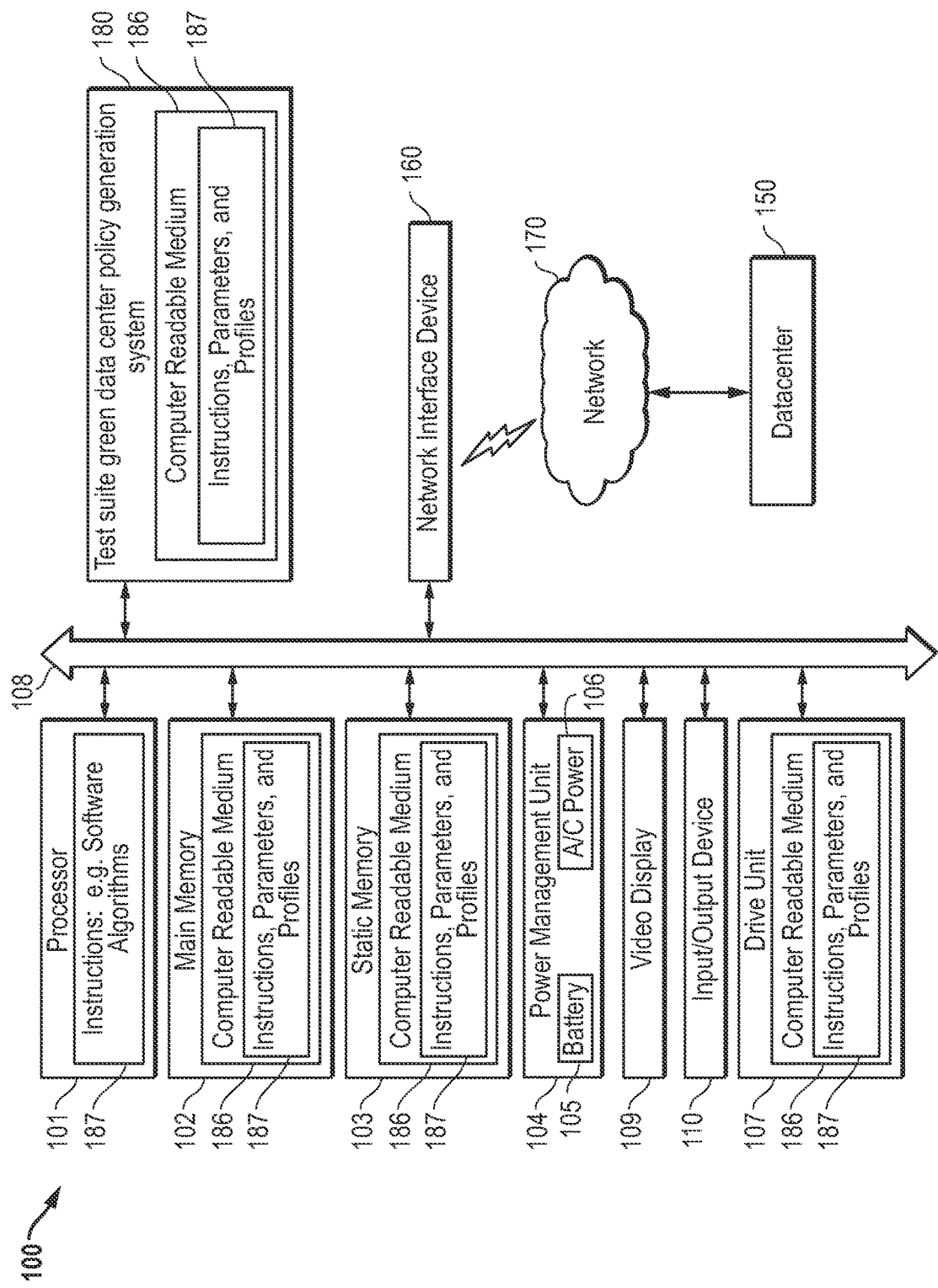
FIG. 1 is a block diagram illustrating a cloud-based Unified Endpoint Management (UEM) platform information handling system executing a software test suite green data center policy generation system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Client information handling systems (e.g., host computers) executing software test suites may do so for testing various specific features for software under development. Execution of any of a plurality of software test suites often access many different data storage systems (e.g., one or more data centers), or portions thereof (e.g., specific servers) in various locations while testing prior to releasing a final software product. A data storage system in embodiments of the present disclosure may comprise one or more data centers, and each data center within a data storage system may be located in a different geographic area than other data centers. Many systems exist for optimizing performance of hardware components at such data storage systems or datacenters to process software test suite input/output (IO) commands across a single data center or a plurality of such data centers located in various places in order to maximize the speed, efficiency, or throughput (e.g., number of calls processed within a set period of time) of the overall enterprise system or across all hardware components of an enterprise data storage system, referred to herein as data storage system/data center(s). However, access to one or more data centers of an enterprise may be made by a variety of software test suite types selected from a plurality of software test suites. This variety of software test suite types varies from type to type in the required levels of data center processing resources, data center memory resources, data center computing node back-end communication adapters or network fabric, or other data center hardware that is actually needed to handle IO commands while executing any given software test suite type. Currently, general quality of service requirements for generally executing test suites reserve a portion of one or more data centers to execute any test suite during software development testing. Thus, a system for optimizing performance of data center hardware components during testing of such software so as to minimize carbon dioxide (CO2) or other greenhouse gas (GHG) emissions is needed.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. Further, such emissions may also influence a cloud computing customer's selection of cloud-based computing resources, including various hardware components within data storage system/data center(s), such as servers, computing nodes, storage engines, storage arrays, fabric connections, or managed drives operated within one or more data centers for a larger enterprise system. GHGs emitted by any given hardware component of the data storage system/data center(s) within an enterprise network may be dependent upon power consumed during operation of the hardware component, which may in turn be dependent on the workload placed on each hardware component. Many hardware components, such as memory hardware (e.g., storage arrays, managed drives), processors (e.g., central processing units (CPUs), graphics processing units (GPUs) within storage engines or computing nodes), or peripheral component interconnect express (PCIe) cards or other application-specific integrated circuit (ASIC) cards that operate as computing node back-end communication adapters and may be referred to as "slics" and operate with one or more network paths (e.g., fabric connections) may receive constant power supply, regardless of whether the components are actually used. For example, some portion of each of these hardware component groups (e.g., processing system, memory, fabric) in enterprise data center systems may be reserved for execution of a software testing application, referred to herein as software testing suites, operating on a host computer, based on general Quality of Service (QoS) requirements for executing any of the software testing applications that may issue a variety of input/output (IO) commands received from the host computer or storing a variety of data at the data storage system/data center during testing of various software features. These general QoS requirements may be set to ensure access to hardware component resources for testing of any portion of the software, rather than on a per-feature or per-test suite basis. In other words, these general QoS requirements may reserve some set capacity of any given hardware component needed to execute any of the test suites for testing specific software features, regardless of the test suite actually being executed. A solution is needed to identify when the load-balancing agent at the data storage system/data center over-allocates capacity of any data center hardware component pursuant to these general QoS requirements during testing relative to actual needed data center hardware resources for testing of a particular software feature and that solution should determine and power down such over-allocated or underutilized hardware components, in order to limit unnecessary power consumption and consequent carbon emissions by these underutilized hardware components during execution of specifically selected software testing suites for particular software feature testing.

The software test suite green data center policy generation system in embodiments of the present disclosure addresses these issues by identifying an over-allocated capacity for data center hardware components reserved by the load-balancing agent of a data storage system/data center for testing of a software suite by executing a utilization forecasting engine that utilizes data center operational telemetry data from previous executions of a software testing suite associated with a particular software testing suite identifier to predict data center hardware utilization of future executions of an identified software testing suite associated with a similar software testing suite identifier. Code instructions of a prediction engine may thus be trained with software test suite execution parameters for each type of identified software testing suite having a particular software testing suite identifier to predict capacity necessary from enterprise data center or datacenters. In this way, portions of the generally reserved data center hardware resources for execution of software suites may be tailored to determine which portions reserved are likely to be underutilized during an upcoming time window during testing of a particular feature of the software suite. Software test suite execution parameters of upcoming executions for a selected software testing suite having a specified software testing suite identifier may further be used with the trained utilization forecasting engine to adjust the predicted data center hardware utilization capacity necessary for a given upcoming execution. Such software test suite execution parameters may include indications of the number of cycles of testing to be run, volumes of data or data rates to be used during such software feature testing, whether certain IO commands are to be handled sequentially or in parallel, and other aspects or variations for a given software testing suite type associated with a particular software testing suite identifier. With such a forecasted capacity for a software testing suite of a particular type associated with a specified software testing suite identifier, an instruction may be transmitted within a green data center policy by a software test suite green data center policy generation system to power down those over-allocated components that were reserved pursuant to general QoS requirements during execution of that selected test suite.

The software test suite green data center policy generation system in embodiments herein may train a time-series utilization forecasting engine to predict a duration of execution and a future utilization rate for each of a plurality of data center hardware components (e.g., memory hardware, processors, PCIE card or other ASIC card, fabric network paths). This trained time-series utilization forecasting engine may predict capacity needed for an upcoming particularly-identified software test suite execution based on training from previously recorded execution durations and load-balancing instructions reserving certain capacities for various data center hardware components, and measured utilization rates for each of the plurality of components during previous execution of the particularly-identified test suite for testing a particular software feature and that is associated with a software test suite identifier. The trained time-series utilization forecasting engine may adjust predicted data center capacity needs for the particularly-identified software test suite based on received software test suite execution parameters as described upon receiving a commencement command selecting the particularly-identified software test suite. Such a commencement command may include selection of software test suite execution parameters for the software feature testing as well as the software test suite identifier to indicate the type of software test suite to be executed.

The software test suite green data center policy generation system in embodiments herein may generate green data center policies for adjusting capacity needed from the reserved data center hardware component capacity set aside generally for software test suite execution, and tailor it to satisfy the future, predicted utilization rates predicted for an upcoming testing of a specific software feature with the identified software test suite based on its software test suite identifier and user software test suite execution parameters for the test. The green data center policy generated may result in a command to a green policy agent an one or more data centers to power down over-allocated data center hardware components that are reserved utilization capacity (e.g., as reserved by the load-balancing agent at the data center in response to general QoS requirements not tailored to any specific software feature being tested) above the predicted future utilization rates or predicted data center hardware capacity determined for the particularly-identified and selected software test suit to be executed at one or more data centers. In such a way, the software test suite green data center policy generation system may predict and decrease power consumed and $CO_2$ emitted by underutilized data center hardware components during testing of a particular software feature at a data center or data storage system.

FIG. 1 illustrates an information handling system 100 according to several aspects of the present disclosure. As described herein, an information handling system 180 may execute code instructions of a software test suite green data center policy generation system 180 operating at a Unified Endpoint Management (UEM) platform information handling system to identify hardware components of a data storage system/data center 150 that are predicted to be underutilized during execution of a particular test suite identified via a software test suite identifier for testing a particular feature of a software application under development. Such over-allocated data center hardware resources predicted to be underutilized from the reserved portion of the data center or data centers for general execution of a plurality of software suites may be powered down via an instruction generated from a green data center policy for by one or more date center hardware component types during future executions of that particularly-identified software test suite. Some or all of portions and components information handling system 100 in FIG. 1 may also represent one or more portions of a data storage system/data center(s) 150 (e.g., computing nodes or storage engines as described in greater detail below with respect to FIG. 2) according to embodiments herein, and information handling system 100 may also serve as a UEM platform device, or a data storage system/data center(s) managing the data storage system/data center(s) 150 hardware components, according to various embodiments herein. Data storage system/data center(s) 150 hardware components operational telemetry measurements including hardware component utilization rates, data center hardware component performance analytics (e.g., volume of encryption tasks, deduplication tasks, compression tasks), software test suite execution identifiers for identifying which of a plurality of software features are being tested during a given time window by a software test suite type, Quality of Service (QoS) requirements (e.g., reserving capacity of one or more data center 150 hardware components during software testing periods), and load-balancing instructions for reserving data center hardware components for execution of software test suites pursuant to those QoS requirements may be gathered during routine monitoring periods from a plurality of data storage system/data center(s) 150 hardware components. The data storage system/data center(s) 150 managing such components may routinely transmit such data center operational telemetry measurements to the UEM platform 100 executing the software test suite green data center policy generation system 180 in an embodiment during execution of one or more types of software test suites. PMU 104 may include a power management controller or other processor to monitor power consumption levels by data storage system/data center(s) 150 hardware components. Some or all of the information handling system 100 of FIG. 1 may operate at a UEM platform information handling system or as a portion of a data storage system/data center(s) 150 according to various embodiments herein. The UEM platform 100 in an embodiment may manage power consumed by underutilized hardware components of the data center 150 forecasted via execution of code instructions of the software test suite green data center policy generation system. This power management or reduction during execution of a particularly identified software test suite for testing a particular feature of a software application under development is done so as to minimize power consumed and $CO_2$ generated by powering on underutilized or over-allocated data center hardware components during such particularly identified software test suite executions as compared to portions of data center resources reserved and powered pursuant to general QoS requirements for software testing and execution of any software testing suite.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory (RAM), dynamic RAM (DRAM), etc.), nonvolatile memory (read-only memory, flash memory, non-volatile RAM (NVRAM), etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit (PMU) 104 supplying power to the information handling system 100, via a battery 105 or an alternating current (A/C) power adapter 106 may supply power to one or more components of the information handling system 100, including the hardware processor 101, or other hardware processing resources executing code instructions of the software test suite green data center policy generation system 180, the wireless network interface device 160, a static memory 103 or drive unit 107, a, a video display 109, or other components of an information handling system. The PMU 104 may also include a controller to measure and report power consumption by one or more components of an information handling system such as the data storage system/data center(s) 150 hardware components. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the software test suite green data center policy generation system 180, that may operate on servers or systems, remote data centers, or on-box in individual data storage system/data center(s) 150 hardware components according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Such a hardware processor 101 in an embodiment may be referred to herein as a "local" processor, as it is "local" to the UEM platform of which the information handling system 100 may comprise all or a part. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system with processing resources executing code instructions of a software test suite green data center policy generation system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHZ, 5 GHZ, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing code instructions for systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the code instructions 187 may be transmitted or received over the network 170 via the network interface device 160. The information handling system 100 may include a set of instructions 187 that may be executed to identify data center 150 hardware components that are predicted to be reserved for use for software test suite execution, but underutilized during execution of a particularly identified software test suite for testing of a particular software feature within an upcoming time window. This set of instructions 187 executed by a processing resource may operate as a software test suite green data center policy generation system 180. The software test suite green data center policy generation system 180 may operate to determine over-allocated data center hardware resources for particularly identified software test suites including software test suite execution parameters for execution and power down those over-allocated components during the upcoming time window. For example, instructions 187 may include a particular example of a software test suite green data center policy generation system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The software test suite green data center policy generation system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the software test suite green data center policy generation system 180, firmware or software algorithms, processes, and/or methods may be stored here. Such code instructions 187 may comprise forecasting a future utilization rate across a plurality of data storage system/data center(s) 150 hardware components based on which software test suite is predicted to be executed within a given time window, and to power down those predicted underutilized components. The software test suite green data center policy generation system 180 may operate on hardware processing resources within a Unified Endpoint Management (UEM) platform 100 that gathers telemetries from a plurality of data storage system/data center(s) 150 hardware components via the network 170 that describe operating environments for those data storage system/data center(s) 150 hardware components during previous execution of each of several particularly identified software test suites to train code instructions of a time-series utilization forecasting engine. The UEM platform 100 in an embodiment may operate to identify information technology (IT) issues at data storage system/data center(s) 150 hardware components, and to provide support for such issues, including automatically updating drivers or hardware components, as needed. The UEM platform in an embodiment may operate as a cloud-based service to store data (e.g., operating environment telemetries for remote data storage system/data center(s) 150 hardware components) within memory 102, static memory 103, or computer readable medium 186 received via network 170. In some embodiments the information handling system 100 may be a server executing a UEM platform.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the software test suite green data center policy generation system 180 may be stored in static memory 103, or the drive unit 107 on a computer-readable medium 186 such as a flash memory or magnetic disk in an example embodiment. More specifically, telemetries describing power consumption and workloads for data storage system/data center(s) 150 hardware components may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device." a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express (PCIe) card, a Personal Computer Memory Card International Association (PCMCIA) card, or other such expansion card), or a system (such as a motherboard, a system-on-a- chip (SoC), or a stand-alone device). The hardware system, hardware device, hardware controller, or hardware module may execute software, including firmware embedded at a device, such as an Intel® Core class hardware processor, ARM® brand hardware processors, Qualcomm® hardware processors, or other hardware processors and chipsets, or other such device, or software capable of operating a relevant environment of the information handling system. The hardware system, hardware device, hardware controller, or hardware module may also comprise a combination of the foregoing examples of hardware, hardware processors, or controllers executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
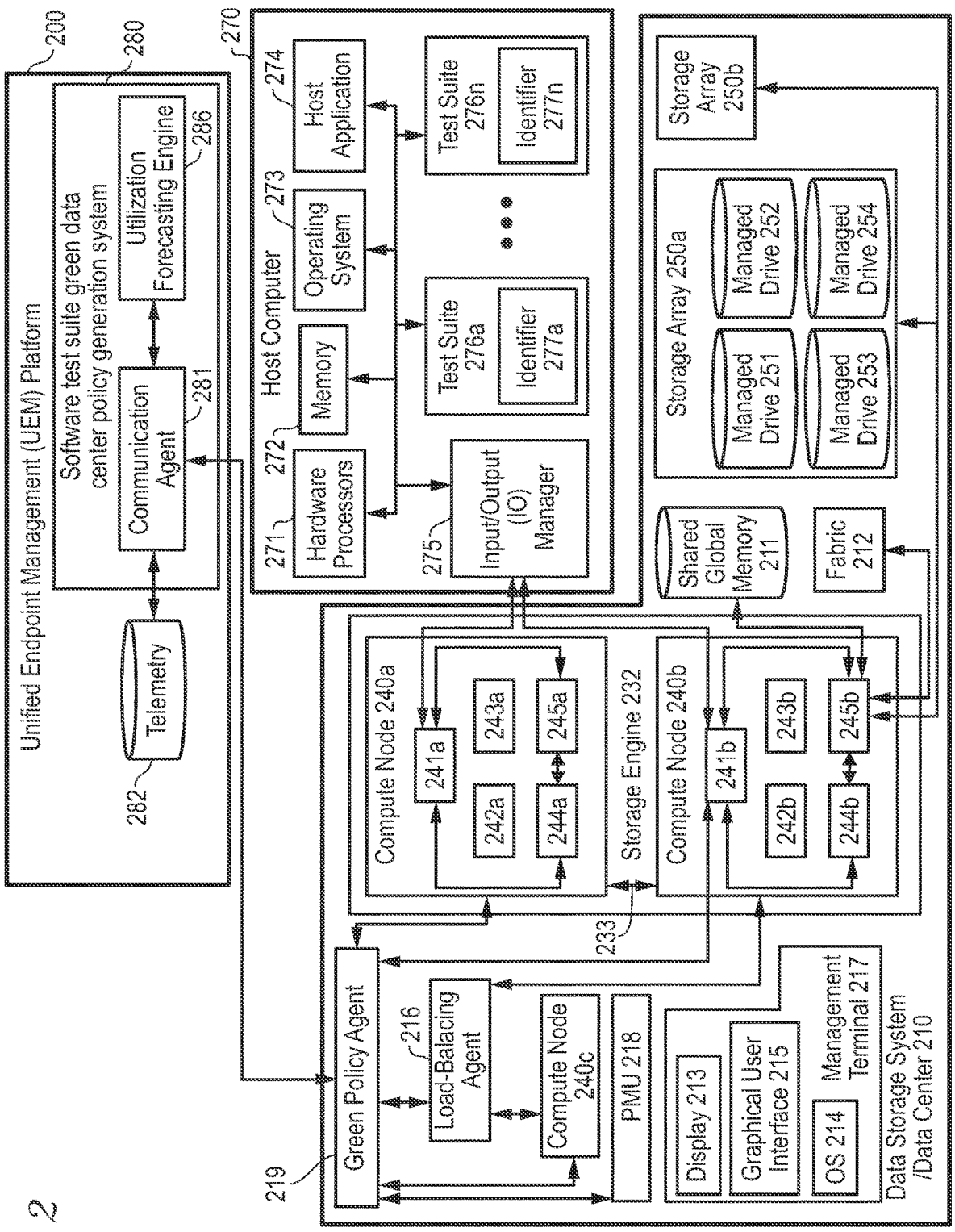
FIG. 2 is a block diagram illustrating a software test suite green data center policy generation system to manage an enterprise data storage system with one or more data center(s) having a green policy agent according to an embodiment of the present disclosure.

FIG. 2 is a block diagram illustrating a software test suite green data center policy generation system 280 executing on a unified endpoint management (UEM) platform 200 information handling system according to an example embodiment. Code instructions of the software test suite green data center policy generation system 180 are executed by one or more processing resources on the UEM platform 200 for identifying data storage system/data center 210 hardware components in a data center or data centers 210 that are predicted to be underutilized during execution of a particularly identified software testing suite 276a among a plurality of software testing suites 276a-276n relative to the reserved portion of data center hardware resources reserved for software testing among any software testing suite 276a-276n. The software test suite green data center policy generation system 180 may further generate a green data center policy recommending or instructing the powering down of those over-allocated data center hardware components during upcoming execution of a selected, particularly identified software test suite 276a, including software test suite execution parameters provided for the upcoming execution. By powering down these underutilized data center 210 hardware components, execution of code instructions for the software test suite green data center policy generation system 180 may minimize the power consumed and $CO_2$ emitted due to unnecessary power supply to these underutilized hardware components in data center 210. As described herein, a data storage system/data center 210 in various embodiments herein may comprise one or more data centers, and each data center within a data storage system having multiple data centers may be located in a different geographic area than other data centers. Each data center (e.g., 210) in an example embodiment may comprise at least one compute node (e.g., 240a), a load-balancing agent 216, a green policy agent 219, a management terminal 217, a power management unit (PMU) 218, and at least one storage array 250a. These data storage system hardware 6 components each may be explained in greater detail below.

In an embodiment, the data storage system/data center(s) 210 may provide data storage services and even processing resources for a plurality of host computers (e.g., 270), which may transmit and receive data with the data storage system/data center 210 during execution of a software testing application such as any of the plurality of software test suites 276a-276n. The host computer 270 performing such software testing may comprise one or more hardware processors 271, a local-to-host memory 272, an operating system 273, and one or more host applications 274, as well as testing software such as any of the plurality of software test suites 276a-276n executed to test various software features prior to release of developed software to a third party. The processor(s) 271 in an embodiment may comprise one or more multi-core processors including central processing unit (CPU), graphics processing unit (GPU), or combinations thereof. The local-to-host memory 272 in an embodiment may include volatile memory (e.g., Random Access Memory (RAM) of any type), or tangible persistent storage components of one or more technology types (e.g., Solid State Drives (SSDs), Hard Disk Drives (HDDs), Storage Class Memory (SCM), Enterprise Flash Drives (EFDs), Serial Advanced Technology Attachment (SATA) drives, or Fiber Channel (FC) drives. The host computer 270 in an embodiment may support multiple virtual hosts running on virtual machines or containers. In some embodiments, host computer 270 may be implemented as a virtual machine within storage system 210.

In an embodiment, the host application 274 may comprise any type of software directing the hardware processor 271 to access data stored in memory either locally (e.g., at 272 comprising volatile memory or persistent storage), or within the data storage system/data center(s) 210. More specifically, host application 274 in an example embodiment may include file systems, e-mail systems, business applications, or the like. Further host information handling system may include one or more software development testbed applications such as the plurality of software test suites 276a-276n. The plurality of software test suites 276a-276n may, for example, execute code instructions of testbed software testing applications to test various features of a software application under development at the host information handling system 270. The plurality of software test suites 276a-276n may utilize a portion of data center hardware resources reserved for execution of any of the plurality of software test suites 276a-276n to meet generalized quality of service requirements required to test various software features under development. The plurality of software test suites 276a-276n may each target testing for particular developed software features in an embodiment. Accordingly, the plurality of software test suites 276a-276n may be differentiated and associated with respective software test suite identifiers 277a-277n indicating differentiated types of software test suites from among the plurality of software test suites 276a-276n based on software features to be tested in embodiments herein.

The data storage system/data center(s) 210 in an embodiment may maintain data for the host application 274 running on the host computer 270. For example, host application 274 may write data of the host application 274 to the data storage system/data center(s) 210 and read data of host application 274 from the data storage system/data center(s) 210, via an input/output (IO) manager 275, in order to perform various functions. Such IO commands in various embodiments described herein may be accompanied by Quality of Service (QOS) requirements, or may be associated with QoS requirements stored at the data storage system/data center(s) 210. These QoS requirements may include, for example, a minimum capacity for one or more hardware components (e.g., data center processor hardware, data center memory hardware, data center fabric hardware) that may be reserved for testing via the host application 274 of software under development. In other embodiments, these QoS requirements may identify a minimum throughput or processing speed, maximum allowable latency, or ability to perform specific tasks (e.g., encryption, deduplication, compression). In some embodiments, these QoS requirements may be set based on the software application to be tested, or may be set based on the customer (e.g., operator of the host computer 270 and developer of the software application being tested via the host application 274).

Similarly, for each of the plurality of software test suites 276a-276n during testing of software test features, a generalized QoS requirement may apply for conducting any of the plurality of software test suites 276a-276n. On such a basis, previous systems may reserve a portion of data center hardware resources for conducting any of the plurality of software test suites 276a-276n. For example, the plurality of software test suites 276a-276n may write data during execution of the software feature testing to the data storage system/data center(s) 210 and read data from the data storage system/data center(s) 210, via the input/output (IO) manager 275, in order to perform various functions and test the software feature. The requirement of such IO commands in various embodiments for any of the plurality of software test suites 276a-276n described herein may be accompanied by generalized Quality of Service (QOS) requirements, or may be associated with generalized QoS requirements stored at the data storage system/data center(s) 210 for executing software test suites. These general QoS requirements may include, for example, a minimum capacity for one or more hardware components (e.g., data center processor hardware, data center memory hardware, data center fabric hardware) that may be reserved for testing via any of the plurality of software test suites 276a-276n for software under development. In other embodiments, these generalized QoS requirements may identify a minimum throughput or processing speed, maximum allowable latency, or ability to perform specific tasks (e.g., encryption, deduplication, compression) for any of the plurality of software test suites 276a-276n. In some embodiments, these generalized QoS requirements may be set based on the overall software application to be tested, or may be set based on the customer (e.g., operator of the host computer 270 and developer of the software application being tested). According to embodiments herein, the plurality of software test suites 276a-276n may be particularly identified by respective software test suite identifiers 277a-277n. Further, code instructions of a time-series utilization forecasting engine 286 of the software test suite green data center policy generation system 280 may be used to determine specific data center hardware resources predicted capacity for particularly identified software test suites 276a among the plurality of software test suites 276a-276n to identify over-allocated data center hardware resources compared to the data center hardware resources reserved for any of the plurality of software test suites 276a-276n based on generalized QoS requirements.

The data storage system/data center(s) 210 in an embodiment may comprise one or more storage engines (e.g., 232), which may each further comprise one or more compute nodes 240a, or 240b, possibly including but not limited to storage servers and storage directors for providing data storage services. For example, storage engine 232 in an embodiment may comprise compute nodes 240a and 240b. In some embodiments, pairs of the compute nodes (e.g., 240a and 240b) are organized within a storage engine (e.g., 232), for purposes of facilitating failover between compute nodes (e.g., between 240a and 240b) within storage system 210. In some embodiments, the paired compute nodes (e.g., 240a and 240b) of each storage engine (e.g., 232) are directly interconnected by communication links (e.g., 233). As used herein, the term "storage engine" will refer to a storage engine, such as storage engine 232, which has a pair of (two independent) compute nodes (e.g., 240a and 240b). A given storage engine (e.g., 232) is implemented using a single physical enclosure and provides a logical separation between itself and other storage engines of the storage system 210. A given storage system 210 may include one or more of such storage engines (e.g., 232). Storage engine compute nodes 240a and 240b may include computing node back-end communication adapters such as peripheral component interconnect express (PCIe) cards or other application-specific integrated circuit (ASIC) cards as well as one or more hardware processors in various embodiments. PCIe or other ASIC cards may include compression hardware cards, deduplication hardware cards, and encryption hardware cards, fabric interconnect hardware cards, or other ASIC based hardware system as computing node back-end communication adapters for operation at data storage system/data center 210 and may be referred to as slics.

Each of the plurality of software test suites 276a-276n may actually utilize differing levels of each type of the data center hardware resources described above and these differences may result in underutilized portions of each type of data center hardware resource to remain powered on in the reserved portion of the data center 210 based on generalized QoS requirements for any software test suite execution. This may be further compounded by the fact that each particularly identified software test suite 276a having its software test suite identifier 277a, may operate under different software test suite execution parameters during various executions including adjustable aspects like number of cycles to be run, amount of data to be processed, required speed or throughput of processing, types of data to be processed, or other factors.

Each compute node (e.g., 240a, or 240b), includes processors (e.g., 242a or 242b) and a local-to-node volatile memory (e.g., 243a, or 243b). The processors (e.g., 242a or 242b) may include a plurality of multi-core processors of one or more types, e.g., including multiple central processing units (CPUs), graphics processing units (GPUs), PCIe or other ASIC hardware cards and combinations thereof. Each processor (e.g., 242a or 242b) of the data storage system/data center(s) 210 in an embodiment may be referred to herein as "local-to-data storage system," indicating location of that processor within the data storage system/data center(s) 210, or "local-to-node," indicating location of the processor within a computing node (e.g., 242a or 242b, respectively) of the data storage system/data center(s) 210. Processors (e.g., 242a, or 242b) referred to herein as "local-to-data storage system," or "local-to-node," in such a manner may also be considered as remote hardware processors from the perspective of the UEM platform 200, in that the hardware processors (e.g., 242a or 242b) located at the data storage system/data center(s) 210 in an embodiment may be located "remotely" from the UEM platform 200. Each of the plurality of software test suites 276a-276n may actually utilize differing levels of computing node resources described above and these differences may result in under-utilized portions of each the compute node resources to remain powered on in the reserved portion of the data center 210 based on generalized QoS requirements for any software test suite execution depending on the software feature being tested.

The local-to-node volatile memory (e.g., 243a, or 243b) may include, for example and without limitation, any type of RAM. Each compute node (e.g., 240a, or 240b) may also include one or more front end adapters (e.g., 241*a*, or 241*b*, respectively) for communicating with the host computer 270, a green policy agent 219, and a load-balancing agent 216 of the data storage system/data center(s) 210. Each compute node (e.g., 240*a*, or 240*b*) may also include one or more back-end communication adapters (e.g., 245*a*, or 245*b*, respectively) for communicating with respective associated back-end drive arrays (e.g., 250*a*, or 250*b*), thereby enabling access to managed drives (e.g., 251, 252, 253, or 254). A given storage system 210 may include one back-end drive array (e.g., 250*a*) or multiple back-end drive arrays (e.g., 250*a* and 250*b*). Each of the plurality of software test suites 276*a*-276*n* may actually utilize differing levels of data center memory resources described above and these differences may result in underutilized portions of each the data center memory resources to remain powered on in the reserved portion of the data center 210 based on generalized QoS requirements for any software test suite execution depending on the software feature being tested.

Each compute node (e.g., 240*a* or 240*b*) may also control one or more network paths via these front end adapters (e.g., 241*a* or 241*b*) and back-end adapters (e.g., 245*a*, or 245*b*). The front end and back end adapters (e.g., 241*a* and 245*a*, or 241*b* and 245*b*, respectively) for example may comprise a PCIe or other ASIC card as computing node back-end communication adapters or slics operating to route incoming IO commands and outgoing responses (if any) between the memory hardware (e.g., storage arrays and managed drives) of the data storage system/data center 210 and the host computer 270 and to conduct compression, encryption, or other functions on data in response to IO commands issued during testing of a software application via host application 274. In some cases, particular fabric network paths, PCIe cards or other ASIC cards (e.g., 245*a*, or 245*b*) or other computing node back-end communication adapters may be dedicated to particular types of tasks, such as compression, deduplication, or encryption. Each of the plurality of software test suites 276*a*-276*n* may actually utilize differing levels of data center backend adapter or fabric network path resources described above and these differences may result in underutilized portions of each the data center backend adapter or fabric network path resources to remain powered on in the reserved portion of the data center 210 based on generalized QoS requirements for any software test suite execution depending on the software feature being tested.

In some embodiments, managed drives (e.g., 251, 252, 253, or 254) are storage resources dedicated to providing data storage to storage system 210 or are shared between a set of storage systems (e.g., 210). Managed drives (e.g., 251, 252, 253, or 254) may be implemented using numerous types of memory technologies, for example and without limitation, any of the SSDs and HDDs mentioned above. In some embodiments the managed drives (e.g., 251, 252, 253, or 254) are implemented using NVM (Non-Volatile Memory) media technologies, such as NAND-based flash, or higher-performing SCM (Storage Class Memory) media technologies such as 3D XPoint, dynamic RAM (DRAM), and ReRAM (Resistive RAM). Managed drives (e.g., 251, 252, 253, or 254) may be directly connected to the compute nodes (e.g., 240*a* or 240*b*) using a PCIe (Peripheral Component Interconnect Express) bus or may be connected to the compute nodes (e.g., 240*a* or 240*b*) for example, by an IB (InfiniBand) bus or fabric.

In some embodiments, each compute node (e.g., 240*a* or 240*b*) also includes one or more channel adapters (e.g., 244*a*, or 244*b*, respectively) for communicating with other compute nodes directly or via an interconnecting fabric 212.

An example interconnecting fabric 212 may be implemented using InfiniBand. Each compute node (e.g., 240*a* or 240*b*) may allocate a portion or partition of its respective local-to-node volatile memory (e.g., 243*a*, or 243*b*, respectively) to a virtual shared "global" memory 211 that can be accessed by other compute nodes (e.g., 240*a* or 240*b*), e.g., via DMA (Direct Memory Access) or RDMA (Remote Direct Memory Access). Shared global memory 211 will also be referred to herein as the cache of the storage system 210.

As described herein, the data storage system/data center(s) 210 maintains data for the plurality of software test suites 276*a*-276*n* running on one or more enterprise host computers (e.g., 270) to test software under development by the operator of the host computer 270. Logical storage devices are created and presented to the plurality of software test suites 276*a*-276*n* for storage of the software test suite data during execution. The host memory 272 is a single data storage device having a set of contiguous fixed-size LBAs (Logical Block Addresses) on which data used by the plurality of software test suites 276*a*-276*n*, or any host application 274, resides and can be stored. However, the data used by any of the plurality of software test suites 276*a*-276*n* and the storage resources available for use during execution of any of the software test suites may actually be maintained by the compute nodes (e.g., 240*a*, or 240*b*) at non-contiguous addresses (tracks) on various different managed drives (e.g., 251, 252, 253, or 254), compute node memories (e.g., 243*a* or 243*b*), or the shared global memory 211 within data storage system/data center(s) 210.

In some embodiments, the data storage system/data center(s) 210 maintains metadata that indicates, among various things, mappings between the memory 272 of the host computer 270 and the locations of extents of software test suite data or even host application data in the managed drives (e.g., 251, 252, 253, or 254), compute node memories (e.g., 243*a* or 243*b*), or the shared global memory 211. In response to an IO (Input/Output command) generated at the software test suites 276*a*-276*n* or a host application 274 in an embodiment, the operating system (OS) 273 may determine whether the command can be serviced by accessing the host memory 272 based on metadata for data classification type or general QoS requirements provided from any of the plurality of software test suites 276*a*-276*n* or the host application 274 or policy settings of the host information handling system 270 or the data center 210. If that is not possible, then the OS 273 prompts the IO manager 275 to transmit the IO command to one of the compute nodes (e.g., 240*a*, or 240*b*) to be serviced by the data storage system/data center(s) 210.

There may be multiple paths between the host computer 270 and the storage system 210, e.g., one path per front end adapter (e.g., 245*a* or 245*b*). The paths may be selected based on a wide variety of techniques and algorithms including performance, load balancing, and CO2 minimization techniques. In the case where IO manager 275 generates a read command, the storage system 210 uses metadata to locate the commanded data, e.g., in the managed drives (e.g., 251, 252, 253, or 254), compute node memories (e.g., 243*a* or 243*b*), or the shared global memory 211 and may include general QoS requirements such as available capacity of one or more data center hardware components, response time, throughput, ability to perform specific tasks (e.g., encryption, compression, deduplication) or the like to conduct, for example, testing aspects of the software test suites 276*a*-276*n*. If the commanded data is not in the virtual shared global memory 211, then the data in an embodiment may be temporarily copied into the virtual shared global memory 211 from the managed drives (e.g., 251, 252, 253, or 254), or compute node memories (e.g., 243a or 243b) and sent to the host application 274 by the front-end adapter (e.g., 245a or 245b) of one of the compute nodes (e.g., 240a or 24b, respectively). In the case where the IO manager 275 generates a write command, in some embodiments the storage system 210 in an embodiment may copy a block being written into the virtual shared global memory 211 and create new metadata that maps the address of the data on the virtual shared global memory 211 to a location to which the block is written on the managed drives (e.g., 251, 252, 253, or 254) and may include general QoS requirements such as capacity, latency, or the like. The virtual shared global memory 211 in an embodiment may enable the block written on the managed drives (e.g., 251, 252, 253, or 254) to be reachable via all of the compute nodes (e.g., 240a, or 240b) and paths, although the storage system 210 can be configured to limit use of certain paths to certain compute nodes. The data storage system/data center(s) 210 in an embodiment may further comprise a display 213 for display of a graphical user interface 215, as well as an operating system 214.

The execution of code instructions of a green policy agent 219 on one or more hardware processors (e.g., 242a or 242b) at the data center 210 in an embodiment may operate to gather data center operational telemetry describing operational functionality of the various data center hardware components of the data storage system/data center(s) 210, including the storage engine(s) 232, compute nodes 240a, and 240b, compute node processors 242a and 242b, compute node memories 243a and 243b, local-to-node volatile memories 244a and 244b, back-end adapters 245a or 245b, fabric 212, storage arrays 250a and 250b, shared global memory 211, and managed drives 251, 252, 253, and 254 during execution of particularly identified software testing suites 276a among the plurality of software test suites 276a-276n. The green policy agent 219 in an embodiment may be in communication with the various hardware components of the data storage system/data center(s) 210 (e.g., storage engine 232, computing nodes 240a or 240b, compute node processors 242a or 242b, compute node memories 243a or 243b, compute node back-end adapters 245a or 245b, local-to-node volatile memories 244a or 244b, shared global memory 211, fabric 212, storage arrays 250a or 250b, and managed drives 251, 252, 243, or 254) and firmware for those components in an embodiment. For example, the green policy agent 219 may execute code instructions to monitor user defined software test suite execution parameters for execution of any particularly identified software test suite 276a and defined identifiers 277a for the particularly identified test suite 276a. The green policy agent 219 may monitor each execution of the particularly identified software test suites, load-balancing instructions issued by the load-balancing agent 216 for reserving data center hardware components for execution of each particularly identified software test suite pursuant to those general QoS requirements for actual utilization rates and data center hardware performance metrics (e.g., volume of encryption tasks, compression tasks, deduplication tasks), for each of the various hardware components (e.g., 232, 240a, 240b, 241a, 241b, 242a, 242b, 243a, 243b, 244a, 244b, 245a, 245b, 211, 212, 250a. 250b, 251, 252, 253 or 254) in an embodiment.

The execution of code instructions of the green policy agent 219 in an embodiment may also be capable of assessing and adjusting policies within firmware for one or more hardware components, upon managing user approval. For example, the green policy agent 219 may also execute code instructions to direct one or more hardware processors (e.g., 242a or 242b) of the one or more compute nodes (e.g., 240a or 240b, respectively), memory devices (e.g., managed drives 251, 252, 253, or 254, or storage arrays 250a or 250b), PCIe cards or other ASIC cards (e.g., 245a or 245b), or portions of fabric 212 (e.g., specific ports, routers, etc.) to power down or enter a sleep mode. As discussed in embodiments herein, after the software test suite green data center policy generation system is trained for particularly identified software test suites 276a, identified by a software test suite identifier 277a, a green data center policy may be generated to tailor the reserved data center hardware resources to be utilized. The green data center policy may recommend or instruct the green policy agent to limit power from the over-allocated portions of reserved hardware resources at the data center predicted to be unnecessary capacity for a particularly identified software test suite in example embodiments.

The execution of the code instructions of the green policy agent 219 of the data storage system/data center(s) 210 in an embodiment may transmit information recorded from data center hardware operation during execution of software test suites at any given time to the communication agent 281 of the software test suite green data center policy generation system 280 executing at the Unified Endpoint Management (UEM) platform 200. The operational telemetry measurements transmitted from the green policy agent 219 at the data storage system/data center 210 to the UEM platform 200 may further include, for example, various Quality of Service (QOS) requirements for one or more hardware components (e.g., 211, 212, 213, 214, 215, 216, 232, 240a, 240b, 241a, 241b, 242a, 242b, 243a. 243b, 244a, 244b, 245a, 245b, 250a, 250b, 251, 252, 253, or 254) of the data storage system/data center(s) 210, or for the data storage system/data center(s) 210 (e.g., data center) as a whole. For example, a Quality of Service (QOS) requirement such as an ability to perform specific tasks (e.g., encryption, deduplication, compression), or minimum capacity for one or more hardware components (e.g., 211, 212, 213, 214, 215, 216, 232, 240a, 240b, 241a, 241b, 242a, 242b, 243a, 243b, 244a, 244b, 245a. 245b, 250a, 250b, 251, 252, 253, or 254) made available or reserved for execution of a software test suite 276a may be set by operational policy at 210 or be received from host information handling system 270 or a selected software test suite 276a. Such reported data may be used as inputs to train code instructions of the time-series utilization forecasting engine 286 at the software testing suite green data center policy generation system 280 for each particularly identified software test suite 276a.

For example, general QoS requirements received for execution of any of a plurality of software test suites 276a-276n at the host computer 270 in an embodiment may include requirements such as minimum throughput, minimum processing speed, maximum latency, minimum capacity to perform specific tasks (e.g., deduplication, compression, encryption), and minimum memory capacity. These general QoS requirements may be set generally for execution of any given feature or software test suite for the software application under development (e.g., being tested using any of the plurality of software test suites 276a-276n). In other words, in existing systems, these QoS requirements may not take into account which of a plurality of software test suites 276a-276n are being executed at a given time to test a particular feature of the software under development at the host computer 270. The operational telemetry measurements in an embodiment may further include load-balancing instructions issued by the load-balancing agent 216 for reserving data center hardware components or a portion of their available capacities for execution of software test suites pursuant to those QoS requirements.

The load-balancing agent 216 executing code instructions at the data storage system/data center 210 in an embodiment may route incoming IO commands from a particularly identified software test suites 276a pursuant to execution of that particularly identified software test suite 276 and software test suite execution parameters enter by a user to various data center hardware components (e.g., 232, 240a, 240b, 241a, 241b, 242a, 242b, 243a, 243b, 244a, 244b, 245a, 245b, 211, 212, 250a, 250b, 251, 252, 253 or 254) of varying capacities and numbers (e.g., a plurality of storage engines, computing nodes, processors, back-end communication adapters, portions of fabric, storage arrays, or managed drives) in order to meet execution needs of the particularly identified software testing suite 276a. The execution needs of a particularly identified software testing suite 276a may be less than amount of reserved hardware resources that these generalized QoS requirements have reserved for any of the plurality of software test suites 276a-276n.

For example, a particularly identified software test suite 276a may only need a portion of the general QoS requirements which may include a requirement for a minimum processing speed for each IO command incoming from the host computer 270 such that the load-balancing agent 216 may execute code instructions to reserve a certain number of storage engines (e.g., 232), compute nodes (e.g., 240a, 240b, or 240c), or processors (e.g., 242a or 242b) for processing of IO commands received from the host computer 270 in order to ensure that each of these IO commands are processed at a speed that meets these generalized QoS requirements for any of the plurality of software test suites 276a-276n. A particularly identified software test suite 276a may not need as many storage engines (e.g., 232), compute nodes (e.g., 240a, 240b, or 240c), or processors (e.g., 242a or 242b) for processing of IO commands received from the host computer 270 in order to ensure that each of these IO commands are processed at a speed that meets these generalized QoS requirements. As another example, in an embodiment in which received general QoS requirements include a requirement for a minimum throughput (e.g., Gbit/s) for IO commands incoming from the host computer 270, the load-balancing agent 216 may execute code instructions to reserve a certain number of back-end communication adapters (e.g., 245a or 245b), or a specific portion of fabric 212 for transmission of IO commands received from the host computer 270 in order to ensure that each of these IO commands are transmitted at a speed that meets these general QoS requirements for any of the plurality of software test suites 276a-276n. A particularly identified software test suite 276a may not need as many back-end communication adapters (e.g., 245a or 245b), or a specific portion of fabric 212 for transmission of IO commands received from the host computer 270 in order to ensure that each of these IO commands are processed at a speed that meets these generalized QoS requirements. In yet another example, in an embodiment in which received general QoS requirements include a requirement for a minimum memory capacity for performing IO read/write commands incoming from the host computer 270, the load-balancing agent 216 may execute code instructions to reserve a certain number of storage arrays (e.g., 250a or 250b) or managed drives (e.g., 251 252, 253, or 254) for performing of IO read/write commands received from the host computer 270 in order to ensure that each of these IO commands are handled at a speed that meets these general QoS requirements for any of the plurality of software test suites 276a-276n. A particularly identified software test suite 276a may not need as many storage arrays (e.g., 250a or 250b) or managed drives (e.g., 251 252, 253, or 254) for performing of IO read/write commands received from the host computer 270 in order to ensure that each of these IO commands are handled at a speed that meets these generalized QoS requirements.

In another aspect of an embodiment, the load-balancing agent 216 operating at the data storage system/data center 210 in an embodiment may execute code instructions to route incoming IO commands from the execution of a particularly-identified software test suite 276a to various data center hardware components (e.g., 232, 240a, 240b, 241a, 241b, 242a, 242b, 243a, 243b, 244a, 244b, 245a, 245b, 211, 212, 250a, 250b, 251, 252, 253 or 254) of varying function in order to meet these general QoS requirements. For example, as described herein, certain computing node back-end communication adapters (e.g., 245a or 245b), such as PCIe cards or ASIC cards may be dedicated to performance of specific tasks such as encryption, deduplication, or compression. In an embodiment in which received general QoS requirements include an ability to perform IO commands incoming from the host computer 270 for executing any of these specific tasks (e.g., encryption, deduplication, compression), the load-balancing agent 216 may reserve a certain number of back-end communication adapters (e.g., 245a or 245b) dedicated to performance of such tasks for execution of IO commands received from the host computer 270 in order to ensure that each of these IO commands are executed in a way that meets these general QoS requirements for any of the plurality of software test suites 276a-276n. In various embodiments described herein, such load-balancing instructions may identify a percentage capacity of individual data center hardware components (e.g., 232, 240a, 240b, 241a, 241b, 242a, 242b, 243a, 243b, 244a, 244b, 245a, 245b, 211, 212, 250a, 250b, 251, 252, 253 or 254) or percentage capacity of overall data center hardware component groups (e.g., all memory resources, all processing resources, all fiber resources, all back-end communication adapter resources) dedicated to execution of a particularly-identified software test suite pursuant to received general QoS requirements for any of the plurality of software test suites 276a-276n. However, as described in embodiments herein, not all available functions or data center hardware resources may be utilized by every particularly identified software test suite because different tested software features may not need all functional capability or hardware resources reserved at the data center pursuant to generalized QoS requirements. A particularly identified software test suite 276a may not need each function or as much as the entire reserved portion of the data center hardware resources in order to ensure that each of the IO commands from the execution of the particularly identified software test suite 276a are executed and meet these generalized QoS requirements to successfully conduct the software feature testing. The software test suite green data center policy generation system 280 may be trained to determine for each particularly identified software test suite 276a and software test suite identifier 277a, that a portion of the reserved data center hardware resources is over-allocated according to embodiments herein. This determination of green data center policy may be further modified by software test suite execution parameters provided for an upcoming execution of a particularly identified software test suite 276a in embodiments herein.

The PMU 218 in an embodiment may provide power to various data center hardware components based upon instructions received from the data center hardware components themselves, the load-balancing agent 216, or the green policy agent 219. For example, the PMU 218 may receive instructions from the load-balancing agent 216 to provide power to any data center hardware components reserved for execution of a software test suite by the load-balancing agent 216 as described directly above. In other example embodiments, the PMU 218 may provide full power to various data center hardware components (e.g., 232, 240a, 240b, 241a, 241b, 242a, 242b, 243a, 243b, 244a, 244b, 245a, 245b, 211, 212, 250a, 250b, 251, 252, 253 or 254) unless or until it receives a notification from such a component that it has entered an idle mode or sleep mode. In still other example embodiments, the green policy agent 219 in an embodiment may transmit an instruction to the PMU 218 to throttle power to specifically identified data center hardware components (e.g., 232, 240a, 240b, 241a, 241b, 242a, 242b, 243a, 243b, 244a, 244b, 245a, 245b, 211, 212, 250a, 250b, 251, 252, 253 or 254). This may be done pursuant to green data center policy generated by the software test suite green data center policy generation system 280 for a particularly identified software test suit 276a and for its software test suite execution parameters for an upcoming execution. In such embodiments, the PMU 218 may consequently throttle power supplied to over-allocated hardware components at data storage system/data center 210.

In some example embodiments, the PMU 218 may provide power to a sufficient number of various hardware components (e.g., processing hardware, memory hardware, fabric hardware) to meet all of requirements and load-balancing instructions for a specific execution of a particularly identified software test suite 276a with its software test suite execution parameters. More specifically, upon receipt of a general QoS requirement from host application 274 to reserve three terabytes of memory capacity during execution of software test suites, the PMU 218 in an embodiment may provide power to at least managed drives 252, 253, and 254, which may each comprise one terabyte of memory which may be predicted capacity provided in a green data center policy generated for this execution of the particularly identified software test suite 276a. Thus, power is throttled to a portion of the managed drives reserved. In another example, upon receipt of a general QoS requirement from host application 274 to reserve ten terabytes of memory capacity during execution of software test suites, the PMU 218 in an embodiment may provide power to at least storage array 250b, which may each comprise ten terabytes of memory and which may be predicted capacity provided in a green data center policy generated for this execution of the particularly identified software test suite 276a. Thus, the full capacity reserved under general QoS requirements is needed and power is not throttled. In yet another example, upon receipt of a general QoS requirement to guarantee a processing capacity of 100 Gb/s during execution of a software test suite, the PMU 218 in an embodiment may provide power to a minimum number of storage engines (e.g., 232), computing nodes (e.g., 240a or 240b), or computing node processors (242a or 242b) needed to meet such a guaranteed processing capacity. However, the amount of data to be processed may be less such that the hardware resources needed to meet 100 Gb/s is less than reserved generally for such a QoS parameter. In such a situation, power to some data center hardware processing resources may be throttled for a particularly identified software test suite 276a. In yet another example, upon receipt of a general QoS requirement to guarantee a throughput of 100 Gb/s during execution of a software test suite, the PMU 218 in an embodiment may provide power to a minimum number of back-end communication adapters (e.g., 245a or 245b) which may comprise PCIe cards or ASIC cards, and a minimum portion of fabric 212 to meet such a guaranteed throughput. However, the amount of data to be throughput may be less such that the hardware resources needed to meet 100 Gb/s throughput is less than reserved generally for such a QoS parameter. In such a situation, power to some data center hardware processing resources may be throttled for a particularly identified software test suite 276a pursuant to a green data center policy generated for the particularly identified software test suite 276a and its software test suite execution parameters.

As described herein, these general QoS requirements (e.g., guaranteed capacity, throughput, capped latency, processing speed, etc.) may apply to all portions or features of the software application being tested via any of the plurality of software test suites 276a-276n, or may apply to a particular customer (e.g., operator of host 270). However, the actual capacity of these data center hardware components (e.g., 232, 240a, 240b, 241a, 241b, 242a, 242b, 243a, 243b, 244a, 244b, 245a, 245b, 211, 212, 250a, 250b, 251, 252, 253 or 254) that will be utilized during testing of the software application via any particularly identified software test suite 276a may vary depending on the particular feature of the software being tested at a given time and any software test suite execution parameters for an execution occurrence.

For example, some software features, when being tested within a software test suite may involve more or less encryption, compression, or deduplication than the testing of other features. More specifically, a particularly-identified software test suite may test the deduplication features of the software under development, specifically. As a consequence, such a deduplication-specific software test suite may not execute any compression or encryption tasks. The host information handling system 270 performing such a deduplication-specific software test suite, however, may issue general QoS requirements that ensure the ability to test any feature of the software application via the plurality of software test suites 276a-276n. In other words, the general QoS requirements issued by the host information handling system 270 during execution of such a deduplication-specific software test suite may still reserve data center hardware components capable of executing encryption and compression tasks, regardless of the fact that the deduplication-specific software test suite does not involve execution of encryption or compression tasks. In another example, some software test suites may require more or less throughput, latency, or memory capacity than other software test suites as described in embodiments herein.

The software test suite green data center policy management system 280 operating at a UEM platform 200 in an embodiment may execute code instructions to train a time series utilization forecasting engine 286 to predict what hardware component capacities will actually be needed for execution of a particularly identified software test suite 276a host testbed application and any received software test suite execution parameters for testing a specific feature of the software being tested. The software test suite green data center policy management system 280 may then execute code instructions to generate a green data center policy particular to each particularly identified software test suite 276a for an upcoming execution with software test suite execution parameters for powering on only the data center hardware components predicted to be actually used during execution the particularly identified software test suite 276a. In another aspect, the green data center policy generated for a particularly identified software test suite 276a, with a software test suite identifier 277a, for an upcoming execution may recommend throttling power supplied to an over-allocated portion of data center hardware components reserved for use pursuant to received general QoS requirements but not predicted to be actually used during an upcoming execution of particularly identified software test suite 276a.

The UEM platform 200 in an embodiment may gather data center operational telemetry, like that described above, routinely from a plurality of hardware components (e.g., 232, 240a, 240b, 241a, 241b, 242a, 242b, 243a, 243b, 244a, 244b, 245a, 245b, 211, 212, 250a, 250b, 251, 252, 253 or 254) within the data storage system/data center(s) 210 operating in different geographic areas and under different usage patterns. The UEM platform 200 in an embodiment may execute a software test suite green data center policy generation system 280 to identify one or more data center hardware components (e.g., memory components, processors, PCIe cards, other ASIC cards, fabric network paths) predicted to be reserved but underutilized at one or more data centers 210 during an execution of a particularly identified software test suite 276a in an upcoming time window. Previously gathered data center operation telemetry during execution of the particularly identified software test suite 276a may have been used to train a time series utilization forecasting engine 286 of the software test suite green data center policy generation system 280 to execute and provide a predicted data center hardware capacity that will be utilized. This predicted data center hardware capacity prediction may be adjusted by received software test suite execution parameters received for an upcoming time window. Execution of the software test suite green data center policy generation system 280 code instructions in an embodiment generates the green data center policy specific to the particularly identified software test suite 276a identifying the capacity for each of these data center hardware components predicted to actually be utilized during execution of such particularly identified software test suite 276a and adjusted based on any received software test suite execution parameters.

The software test suite green data center policy generation system 280 in an embodiment may execute code instructions to transmit such test suite-specific green data center policies for institution at the green policy agent 219 of the data storage system/data center 210, instructing the PMU 218 to power down one or more of these data center hardware components predicted to be underutilized during future executions of a particular software test suite 276a during an upcoming time window.

Each of these hardware components (e.g., 232, 240a, 240b, 241a, 241b, 242a, 242b, 243a. 243b, 244a, 244b, 245a, 245b, 211, 212, 250a, 250b, 251, 252, 253 or 254) of the data storage system/data center(s) 210 may be under management of or in communication with processors executing code instructions of a load balancing agent 216 and a green policy agent 219 in the data storage system/data center 210. The load-balancing agent 216 and the green policy agent 219 in an embodiment may act as interfaces between the data storage system/data center(s) 210 and the UEM platform 200.

The UEM platform 200 in an embodiment may operate as a cloud-based service in communication with the load balancing agent 216, via a network, to identify information technology (IT) issues at a plurality of components within the data storage system/data center(s) 210 within say, one or more data centers. The UEM platform 200 and local processors executing code instructions of a management software including the software test suite green data center policy generation system 280 may also provide support for such issues, including automatically updating drivers or hardware components, as needed. In a specific embodiment of the present disclosure, the UEM platform 200 may gather operational telemetry measurements from various hardware components (e.g., 232, 240a, 240b, 241a, 241b, 242a, 242b, 243a, 243b, 244a, 244b, 245a, 245b, 211, 212, 250a, 250b, 251, 252, 253 or 254) of the data storage system/data center(s) 210 that describe operating environments for those data center hardware components (e.g., utilization rates, data center hardware performance metrics, QoS requirements) at one or more data centers. As described herein, general QoS requirements may be received pursuant to execution of any software test suite 276a-276n for tested software to be developed at the host computer 270, and may include requirements such as minimum throughput, minimum processing speed, maximum latency, minimum capacity to perform specific tasks (e.g., deduplication, compression, encryption), or minimum memory capacity. These general QoS requirements may be set generally for execution of any given feature tested by any software test suite 276a-276n for the software application under development. The load-balancing agent 216 executing code instructions at the data storage system/data center 210 in an embodiment may route incoming IO commands from execution of a particular software test suite to various data center hardware components (e.g., 232, 240a, 240b, 241a, 241b, 242a, 242b, 243a, 243b, 244a, 244b, 245a, 245b, 211, 212, 250a, 250b, 251, 252, 253 or 254) of varying capacities, functional ability, and numbers (e.g., a plurality of storage engines, computing nodes, processors, back-end communication adapters, portions of fabric, storage arrays, or managed drives) in order to meet these general QoS requirements.

Data center operational telemetry may include data center hardware component utilization rates that may measure actual capacity for each of the data center hardware components (e.g., 232, 240a, 240b, 241a, 241b, 242a, 242b, 243a, 243b, 244a, 244b, 245a, 245b, 211, 212, 250a, 250b, 251, 252, 253 or 254) utilized during execution of a particularly identified software test suite 276a having an associated software test suite identifier 277a (e.g., testing for a particular feature of the software application under development). In particular, such data center hardware component utilization rates may measure whether data center memory resources (e.g., 250a, 250b, 251, 252, 253, or 254), processing resources (e.g., 232, 240a, 240b, 240c, 242a, 242b) or data center back-end communication adapters (e.g., 245a or 245b) reserved by the load-balancing agent 216 pursuant to QoS requirements received from host application 274 were actually utilized during execution of the particularly identified software test suite. This data center operation telemetry may be reported back to the software test suite green data center policy generation system 280 at the UEM platform information handling system 200. In some embodiments, the data center hardware component utilization rates may distinguish between various types of data center hardware components. For example, the data center hardware component utilization rates may measure utilization of flash memory in comparison to non-volatile memory, CPUs in comparison to GPUs, or back-end communication adapters such as PCIe cards or ASIC cards dedicated to performance of encryption in comparison to deduplication or compression during execution of the software test suit green data center policy generation system 280.

A processor or processors at the UEM platform 200 execute code instructions of the software test suite green data center policy generation system 280 in an embodiment to receive this data center operation telemetry during execution of each particularly identified software test suite 276a of the plurality of software test suites 276a-276n to train code instructions of a time series utilization forecasting engine to predict data center hardware utilization capacity for each type of identified software test suite 276a-276n. The software test suit green data center policy generation system 280 may use the trained time series utilization forecasting engine 286 to predict a software test suite execution duration and a utilization rate for one or more data center hardware components (e.g., memory devices, processors, PCIe cards or other ASIC cards, fabric 212) within a data storage system/data center 210, based on previously the recorded utilization rates for each of such data center hardware components during execution of each type of particularly-identified software test suites among the plurality of software test suites 276a-276n, each with an associate software test suit identifier 277a-277n. The particularly identified software test suite 276a will be executed, in part, via executed within IO commands received from the host information handling system 270. As described herein, the user of the host computer 270 may select a particularly identified software test suite, such as 276a in an embodiment. Further, the user may select one or more software test suite execution parameters such as data amounts to be processed, cycles to be performed, speed and response expectation or other software test suite execution parameters that may also be provided in the IO command from the host information handling system 270. The host information handling system 270 may transmit the software test suite identifier 277a of the particularly identified software test suite 276a to be executed and any software test suite execution parameters within IO commands received from the host information handling system 270 to the data storage system/data center 210 and its green policy agent 219. Such a software test suite identifier 277a may be then transmitted to the software test suit green data center policy generation system 280 to determine a green data center policy.

The utilization forecasting engine 286 in an embodiment may be trained using algorithm code instructions based on operational telemetry measurements gathered by the green policy agent 219 over a training period during execution of each type of software test suite among the plurality of software test suites 276a-276n. For example, the utilization forecasting engine 286 operating at the UEM platform information handling system 200 may use the operational telemetry measurements gathered from the green policy agent 219 discussed directly above during a training period in order to predict the duration of the execution of the particularly identified software test suite, based on previous executions of that software test suite and adjusted depending on received software test suit execution parameters such as number of test cycles to be run or an amount of data to be processed or stored. After training for particularly identified software test suites among the plurality of software test suites 276a-276n, the trained utilization forecasting engine may execute code instructions to use that previously-received data center operational telemetry measurements from the training period to later predict actual utilization rates (e.g., between zero and 100 percent of reserved data center hardware capacity for example) during a given execution time window for one or more hardware components (e.g., 232, 240a, 240b, 241a, 241b, 242a, 242b, 243a, 243b, 244a, 244b, 245a, 245b, 211, 212, 250a, 250b, 251, 252, 253 or 254) or one or more groups of hardware components (e.g., memory devices 250a, 250b, 251, 252, 253, 254, processors 242a or 242b, or various PCIe cards or other ASIC cards 245a, 245b, connecting one of a plurality of processors to one of a plurality of memory devices via fabric 212) during execution of any particularly identified software test suite 276a based on its software test suite identifier 277a and any software test suite execution parameters received for an upcoming execution. In this way, a green data center policy may be generated to identify underutilized data center hardware based on previous utilization rates for those data center hardware components or hardware component groups reserved by the load-balancing agent 216 pursuant to received general QoS requirements during execution of a particularly identified software test suite 276a.

In other words, the trained utilization forecasting engine 286 in an embodiment may execute code instructions with inputs of a software test suite identifier 277a and any software test suite execution parameters to predict what percentage of data center hardware component resources reserved by the load-balancing agent 216 for execution of the software test suites pursuant to general QoS requirements will actually be utilized during an upcoming execution of that particularly identified software test suite 276a. For example, the utilization forecasting engine 286 in an embodiment may execute code instructions to predict that execution of a particularly identified software test suite 276a will take one hour and will utilize 40% of fabric 212 resources, 30% of memory resources, and 50% of processing resources reserved by the load-balancing agent 216 for execution of software test suites (e.g., any of a plurality of software test suites 276a-276n) pursuant to general QoS requirements. As another example, the utilization forecasting engine 286 in an embodiment may execute code instructions to predict that none of the memory resources or back-end communication adapters (e.g., PCIe or ASIC cards) that are dedicated to compression or encryption tasks and that have been reserved for execution of software test suites will actually be utilized during an upcoming execution of the particularly identified software test suite 276a. This may be the case, for example, if the particularly identified software test suite 276a is testing only the deduplication capabilities of the software application under development. In other example embodiments, the utilization forecasting engine 286 may execute code instructions to predict that none of the memory resources or back-end communication adapters (e.g., PCIe or ASIC cards) that are dedicated to deduplication tasks or other IO command tasks and that have been reserved for execution of software test suites will actually be utilized the particularly identified software test suite 276a.

The utilization forecasting engine 286 in an embodiment may execute code instructions for any of several time series forecasting algorithms or models known in the art. For example, the utilization forecasting engine 286 in an embodiment may comprise executing code instructions for an autoregressive integrated moving average (AMIRA) time series forecasting model algorithm.

Following training, a processor or processors at the UEM platform information handling system 200 may execute code instructions for the trained utilization forecasting engine 286 of the software test suite green data center policy generation system 280 to determine the predicted execution duration and a percentage of data center hardware component resources reserved by the load-balancing agent 216 for an upcoming execution of a particularly identified software test suite (e.g. 276a) that are predicted to actually be utilized during execution of that particular software test suite 276a and under any adjustments for received software test suite execution parameters set by a user conducting the software testing. For example, the software test suite green data center policy generation system 280 may predict that execution of a particularly identified software test suite is predicted to take one hour and to utilize 40% of fabric 212 resources, 30% of memory resources, and 50% of processing resources reserved pursuant to general QoS requirements by the load-balancing agent 216 for execution of the particularly identified software test suite. As another example, the software test suite green data center policy generation system 280 determine that none of the memory resources or back-end communication adapters (e.g., PCIe or ASIC cards) that are dedicated to compression or encryption tasks and that have been reserved for execution pursuant to general QoS requirements for software test suites are predicted to actually be utilized by the particularly identified software test suite 276*a*. This may be the case, for example, if the particularly identified software test suite 276*a* is testing only the deduplication capabilities of the software application under development in one example embodiment.

The software test suite green data center policy generation system 280 in an embodiment may execute code instructions to generate a green data center policy for upcoming execution of the particularly identified software test suite (e.g., 276*a* for testing the deduplication capabilities of the software under development at host computer 270) under specified software test suite execution parameters selected by a user. Such a green data center policy in an embodiment may include an instruction to maintain power to the percentage of data center hardware component resources otherwise reserved by the load-balancing agent 216 for execution of this particularly identified software test suite 276*a* that are predicted to actually be utilized during execution of that particularly identified software test suite 276*a* for the predicted duration of the particularly identified software test suite 276*a* and its execution parameters. For example, such a green data center policy may include an instruction to maintain power to 40% of fabric 212 resources, 30% of memory resources, and 50% of processing resources reserved by the load-balancing agent 216 pursuant to general QoS requirements for software test suite executions as tailored for the predicted one hour duration of the particularly identified software test suite 276*a* execution under its execution parameters. The green data center policy in such an example embodiment may also include an instruction to power down or throttle power supplied to 60% of fabric 212 resources (e.g., allowing 40% to remain fully powered), 70% of memory resources (e.g., allowing 30% to remain fully powered), and 50% of processing resources (e.g., allowing 50% to remain fully powered) otherwise reserved by the load-balancing agent 216 during the predicted one hour duration of the particularly identified software test suite 276*a* execution. In such a way, the green data center policy generated by the software test suite green data center policy generation system 280 may lower power consumed, for example, by 60% of fabric 212 resources, 70% of memory resources, and 50% of processor resources during the one hour execution of the particularly identified software test suite 276*a* while still meeting actual capacity and performance requirements for such an execution.

In another embodiment, a green data center policy may include an instruction to maintain power to only specific types of data center hardware component resources reserved by the load-balancing agent 216 for execution of the particularly identified software test suite, such as 276*a* having a software test suite identifier 277*a*, that are predicted to actually be utilized during execution of that particularly identified software test suite 276*a* for the predicted duration its execution. For example, such a green data center policy may include an instruction to maintain power to memory resources or back-end communication adapters (e.g., PCIe cards, ASIC cards) dedicated to performance of specific tasks. More specifically, such a green data center policy may include an instruction to maintain power to memory resources or PCIe/ASIC cards dedicated to or capable of (e.g., not dedicated to a particular task) performance of deduplication tasks. The green data center policy in such an example embodiment may also include an instruction to power down or throttle power supplied to memory resources or PCIe/ASIC cards dedicated to execution of other tasks (e.g., compression, encryption) reserved by the load-balancing agent 216 for execution of the particularly identified software test suite 276*a* during the predicted one hour duration of its execution. For example, the green data center policy in such an example embodiment may also include an instruction to power down or throttle power supplied to memory resources or PCIe/ASIC cards dedicated to execution of encryption tasks (e.g., 15% of memory resources and 20% of PCIe/ASIC cards) and dedicated to execution of compression tasks (e.g., 20% of memory resources and 30% of PCIe/ASIC cards) reserved by the load-balancing agent 216 for execution of software test suites pursuant to general QoS requirements. In such a way, during the predicted one hour duration of the particularly identified software test suite 276*a* execution, the green data center policy generated by the software test suite green data center policy generation system 280 may lower power consumed by data center memory hardware components (e.g., 35% of all data center memory hardware components) and back-end communication adapters (e.g., 50% of all PCIe/ASIC cards) while still meeting actual capacity and performance requirements for such an execution. The software test suite green data center policy generation system 280 in an embodiment may transmit this green data center policy associated with the particularly identified software test suite 276*a* to the green policy agent 219 at the data storage system/data center 210 for implementation with one or more PMUs 281 located there.

A processor or processing resources executing code instructions of the green policy agent 219 at the data storage system/data center 210 in an embodiment may receive the test-suite specific green data center policies generated by the software test suite green data center policy generation system 280 via the communication agent 281 upon initiation of a particularly identified software test suite 276*a*. The green policy agent 219 in an embodiment may store the received test-suite specific green data center policies for one or more particularly identified software test suites in various memory hardware components (e.g., 243*a*, 243*b*, 211, 250*a*, 250*b*, 251, 252, 253, or 254) of the data storage system/data center.

A user at the host computer 270 may use a graphical user interface or other interface to select a particularly identified software test suite 276*a* from among a plurality of software test suites 276*a*-276*n* to conduct a test on a particular software feature for a software application under development. Upon selection for execution of the particularly identified software test suite in an embodiment, a compute node (e.g., 240*a*) may receive IO commands from the particularly identified software test suite, such as 276*a* instructing execution of the particularly identified software test suite. The particularly identified software test suite 276*a* may have a software test suite identifier 277 that may be an index number, code, metadata value, or other type of specific identifier within IO commands to the data center 210. The compute node (e.g., 240*a*) in such an embodiment may execute code instructions to notify the green policy agent 219 that the particularly identified software test suite 276*a* is initiating execution with the software test suite identifier 277 and provide any submitted software test suite execution parameters identified by a user such as number of test cycles to be run, type or amount of test data to be processed or stored, throughput requirements, or others.

The green policy agent 219 in an embodiment may execute code instructions to generate or identify a green data center policy associated with the particularly identified software test suite 276*a* via execution of the software test suite green data center policy generation system 280. In an embodiment in which the green data center policy associated with the particularly identified software test suite includes an instruction to power on a certain percentage of specifically identified data center hardware components (e.g., 232, 240*a*, 240*b*, 241*a*, 241*b*, 242*a*, 242*b*, 243*a*, 243*b*, 244*a*, 244*b*, 245*a*, 245*b*, 211, 212, 250*a*, 250*b*, 251, 252, 253 or 254) or data center hardware component groups (e.g., memory resources, processing resources, fabric resources, or back-end communication adapter resources), the green policy agent 219 may execute code instructions to transmit an instruction to the load-balancing agent 216 to route incoming IO commands to only those data center hardware components or groups set to remain powered on. In an embodiment in which the green data center policy associated with the particularly identified software test suite 276*a* includes an instruction to power on specific types of data center hardware components (e.g., memory resources or PCIe/ASIC cards dedicated to specific tasks like deduplication), the green policy agent 219 may execute code instructions to transmit an instruction to the load-balancing agent 216 to route incoming IO commands to only those specific types of data center hardware components set to remain powered on. The load-balancing agent 216 in such embodiments may then execute the received instructions from the green policy agent 219 in lieu of or in addition to the load-balancing instructions generated by the load-balancing agent 216 pursuant to received general QoS requirements. In such a way, the green policy agent 219 in an embodiment may override generalized QoS requirements to tailor capacity reservation for various data center hardware components to the capacity that is predicted to actually be used during execution of a particularly identified software test suite such as 276*a* with software test suite identifier 277*a*.

In an embodiment in which the green data center policy associated with the particularly identified software test suite 276*a* includes an instruction to throttle power to a certain percentage of specifically identified data center hardware components (e.g., 232, 240*a*, 240*b*, 241*a*, 241*b*, 242*a*, 242*b*, 243*a*, 243*b*, 244*a*, 244*b*, 245*a*, 245*b*, 211, 212, 250*a*, 250*b*, 251, 252, 253 or 254) or data center hardware component groups (e.g., memory resources, processing resources, fabric resources, or back-end communication adapter resources), the green policy agent 219 may execute code instructions to transmit an instruction to those data center hardware components or groups to enter an idle or sleep mode, or may transmit an instruction directly to the PMU 218 to throttle power supplied to those components. In an embodiment in which the green data center policy associated with the particularly identified software test suite includes an instruction to throttle power to specific types of data center hardware components (e.g., memory resources or PCIe/ASIC cards dedicated to specific tasks like encryption or compression), the green policy agent 219 may execute code instructions to transmit an instruction to those particular data center hardware components to enter an idle mode or sleep mode, or may transmit an instruction directly to the PMU 218 to throttle power supplied to those components. In still other example embodiments, the green policy agent 219 may execute code instructions to transmit an instruction to the load-balancing agent 216 to instruct the PMU 218 to throttle power supplied to any data center hardware components to which incoming IO commands from the host application 274 will not be routed. The load-balancing agent 216, PMU 218, or data center hardware components in such embodiments may then execute the received instructions from the green policy agent 219 in lieu of or in addition to load-balancing instructions generated by the load-balancing agent 216 pursuant to received QoS requirements. Following the predicted duration of execution for the particularly identified software test suite 276*a*, the PMU 218 may restore power to any data center hardware components powered down pursuant to such a green data center policy instruction. In such a way, the green policy agent 219 in an embodiment may override generalized QoS requirements to power down or throttle power supplied to data center hardware components reserved by the load-balancing instruction pursuant to received QoS requirements that are not predicted to actually be used during execution of a particularly identified software test suite 276*a* identified by the software test suite identifier 277*a*. It is understood that that any software test suite 276*a*-276*n* among the plurality of software test suites 276*a*-276*n* may be selected by a user for testing and be the particularly identified software test suite with a respective software test suite identifier 277*a*-277*n* according to various embodiments herein.

Figure 3:
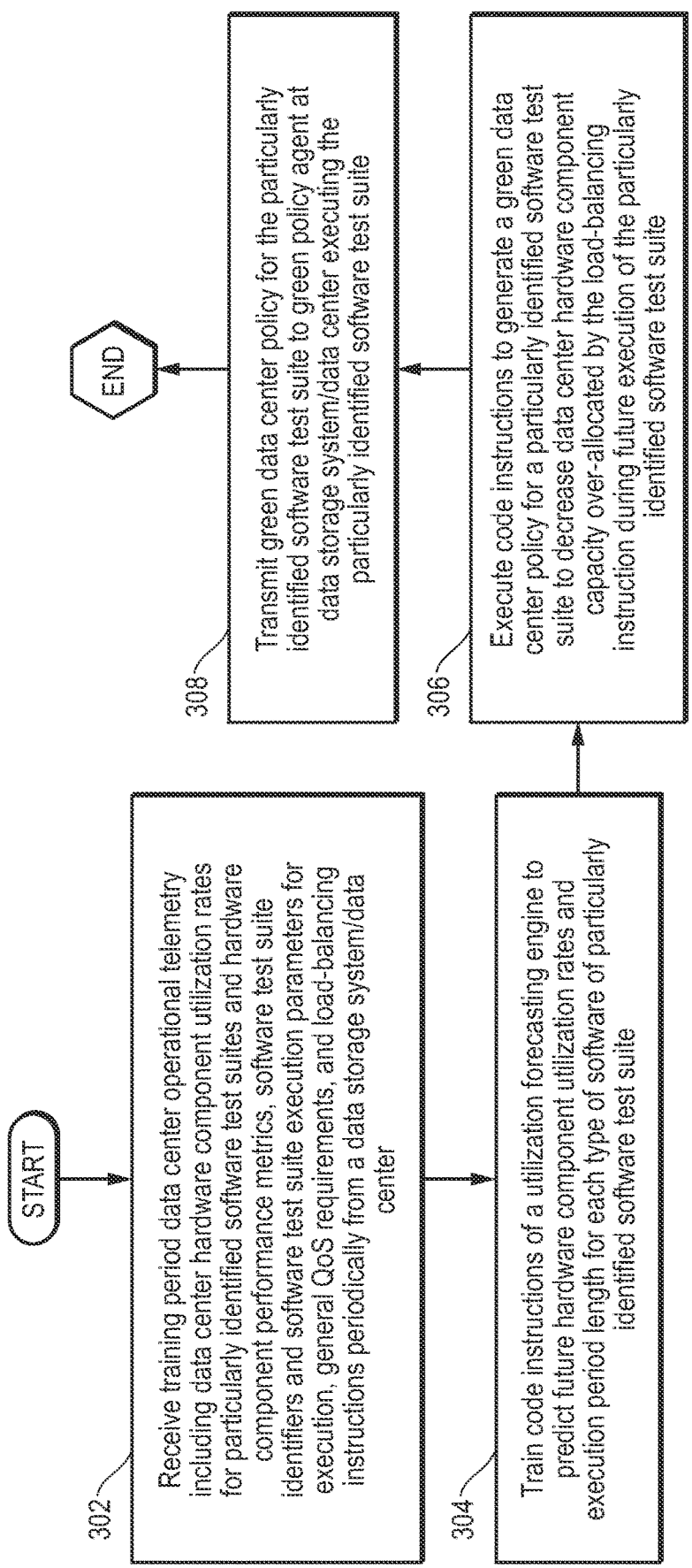
FIG. 3 is a flow diagram illustrating a method of predicting a utilization capacity for various data center hardware components required for execution of a particularly identified software test suite according to an embodiment of the present disclosure.

FIG. 3 is a flow diagram illustrating a method of training and using trained code instructions of a utilization forecasting engine to predict a utilization capacity for various data center hardware components required for execution of a particularly identified software test suite associated with a software test suite identifier according to an embodiment of the present disclosure. As described herein, code instructions of the software test suite green data center policy generation system in an embodiment may identify a predicted capacity for data center hardware components from a portion of a data center otherwise reserved by a load-balancing agent of a data storage system/data center for testing of any software suite.

With that predicted capacity needed for a particularly identified software test suite, the software test suite green data center policy generation system also predicts a portion of reserved data center hardware capacity that will be underutilized during an upcoming time window during testing of a particular software feature with the particularly identified software suite. This may involve training a time-series utilization forecasting engine to predict a duration of execution and a future utilization rate for each of a plurality of data center hardware components (e.g., memory hardware, processors, PCIE card or other ASIC card, fabric network paths), based on previously recorded execution durations, load-balancing instructions determining actual utilization of reserved various data center hardware components, and measured utilization rates for each of the plurality of components during execution of a particularly identified software test suite for testing a particular software feature including any software test suite execution parameters. Further, the software test suite green data center policy generation system may generate green data center policies for powering down over-allocated data center hardware components providing utilization capacity above these predicted future utilization rates tailored to any specific software feature being tested (e.g., as reserved by the load-balancing agent at the data center in response to general QoS requirements for any software test suite)

At block 302, the software test suite green data center policy generation system in an embodiment may receive training period data center operational telemetry from a data center, including data center hardware component utilization rates and data center hardware performance metrics indicating capabilities such as capacity, response times, or processing speed or capabilities. Further, the software test suite green data center policy generation system may receive general quality of service (QOS) requirements for hardware groups in responding to IO commands and determining load-balancing instructions for reserving capacity of various data center hardware components pursuant to the general QoS requirements for hardware in responding to IO commands for executing software test suites to test software features for a software application under development.

Further, the software test suite green data center policy generation system may receive software test suite identifiers to identify types of software test suites that may be executing during collection of those training period data center operational telemetries periodically. For example, in an embodiment described above with respect to FIG. 2, execution of code instructions for the green policy agent 219 at a data storage system/data center 210 may monitor general QoS requirements software test suite identifiers for executing certain software test suites, load-balancing instructions issued by the load-balancing agent 216 for reserving data center hardware components for execution of software test suites pursuant to those general QoS requirements, as well as actual utilization rates and data center hardware performance metrics such as capacities, processing speed, throughput speed or others including functional metrics such as volume of encryption tasks, compression tasks, or deduplication tasks for each of the various hardware components (e.g., 232, 240a, 240b, 241a, 241b, 242a, 242b, 243a, 243b, 244a, 244b, 245a, 245b, 211, 212, 250a, 250b, 251, 252, 253 or 254) in an embodiment.

The data center operational telemetry measurements transmitted from the green policy agent 219 at the data storage system/data center 210 to the UEM platform information handling system 200 may include the software test suite identifiers for currently executing software test suites while data center operational telemetry is being provided for training as well as software test suite execution parameters for each execution. Each type of software test suite may be subject to variations of execution that may be reflected in software test suite execution parameters as described in various embodiments herein. These software test suite execution parameters may be provided to the UEM platform information handling system 200 as part of the training period data provided for each type of software test suite being monitored and sent during a training period. Adjustments to the predicted utilization capacity of data center hardware for the particularly identified software test suite may made with software test suite green data center policy generation system based on received software test suite execution parameters provided by a user or determined from the execution set up or arrangement of the particularly identified software test suite. This may include adjustments for number of test cycles to be run or for determinations of amount of data, type of data, or other adjustable characteristics for initiating a selected software test suite for an execution episode. The software test suite green data center policy generation system in an embodiment may then generate green data center policies for maintaining power to a portion of the reserved hardware component capacity to satisfy the future utilization rates predicted for testing of a specific software feature with a particularly identified software test suite execution. As with embodiments herein, the software test suite execution parameters may cause adjustments to predicted utilization capacities for various particularly identified software test suites.

The green policy agent 219 of the data storage system/data center(s) 210 in an embodiment may transmit information recorded in such a way at any given time as training data to the communication agent 281 of the software test suite green data center policy generation system 280 executing at the Unified Endpoint Management (UEM) platform information handling system 200.

The data center operational telemetry measurements transmitted from the green policy agent 219 at the data storage system/data center 210 to the UEM platform 200 may include various general Quality of Service (QOS) requirements for one or more hardware components (e.g., 211, 212, 213, 214, 215, 216, 232, 240a, 240b, 241a, 241b, 242a, 242b, 243a, 243b, 244a, 244b, 245a, 245b, 250a, 250b, 251, 252, 253, or 254) of the data storage system/data center(s) 210, or for the data storage system/data center(s) 210 (e.g., data center) as a whole. For example, a general Quality of Service (QOS) requirement and hardware performance metrics of reserved hardware resources such as an ability to perform specific tasks (e.g., encryption, deduplication, compression), or minimum capacity for one or more hardware components (e.g., 211, 212, 213, 214, 215, 216, 232, 240a, 240b, 241a, 241b, 242a, 242b, 243a, 243b, 244a, 244b, 245a, 245b, 250a, 250b, 251, 252, 253, or 254) made available or reserved for execution of the plurality of software test suites 276a-276n may be set by operational policy at 210 or be received from host information handling system 270 for software development testing.

More specifically, general QoS requirements received for execution of any software test suites 276a-276n at the host computer 270 in an embodiment may include requirements such as minimum throughput, minimum processing speed, maximum latency, minimum capacity to perform specific tasks (e.g., deduplication, compression, encryption), and minimum memory capacity for any of the software test suites 276a-276n. These QoS requirements may be set generally for execution of any given feature or software test suite for the software application under development (e.g., being tested using software test suites 276a-276n). In other words, in existing systems, these QoS requirements may not take into account which of a plurality of software test suites 276a-276n are being executed at a given time to test a particular feature of the software under development at the host computer 270. The operational telemetry measurements in an embodiment may further include load-balancing instructions issued by the load-balancing agent 216 for reserving a portion data center hardware components or a portion of their available capacities for execution of any software test suites pursuant to those general QoS requirements.

The load-balancing instructions received at block 302 in an embodiment may identify a certain number of various data center hardware components or capacity for certain groups of data center hardware components that have been reserved for execution of the software test suites by the load-balancing agent 216 pursuant to the general QoS requirements. For example, load-balancing agent 216 operating at the data storage system/data center 210 in an embodiment may route incoming IO commands from the host computer 270 pursuant to execution of software test suites 276a-276n generally. The software test suite green data center policy generation system 280 may also receive training data center operational telemetry for actual utilization of the reserved data center resources during execution of particularly identified software test suites as described below. The software test suite green data center policy generation system 280 may receive and determine from load-balancing agent 216 instructions, a number of various data center hardware components or types or capacity for certain groups of data center hardware components that were actually used during execution of a particularly identified software test suite 276a. The various data center hardware components (e.g., 232, 240a, 240b, 241a, 241b, 242a, 242b, 243a, 243b, 244a, 244b, 245a, 245b, 211, 212, 250a, 250b, 251, 252, 253 or 254) of varying capacities and numbers (e.g., a plurality of storage engines, computing nodes, processors, back-end communication adapters, portions of fabric, storage arrays, or managed drives) that were actually utilized in order to execute the particularly identified software test suite may be identified compared to those resources reserved pursuant to general QoS requirements.

More specifically, in an embodiment in which received general QoS requirements include a requirement for a minimum processing speed for each IO command incoming from the host computer 270, the load-balancing agent 216 may reserve a certain number of storage engines (e.g., 232), compute nodes (e.g., 240a, 240b, or 240c), or processors (e.g., 242a or 242b) for processing of IO commands received from the host computer 270 in order to ensure that each of these IO commands are processed at a speed that meets these general QoS requirements. However, execution of a particularly identified software test suite may not utilize all of the reserved certain number of storage engines (e.g., 232), compute nodes (e.g., 240a, 240b, or 240c), or processors (e.g., 242a or 242b) for processing of IO commands received from the host computer 270 during execution of a particularly identified software test suite. A portion of actually utilized number of these data center hardware resources to meet the minimum processing speeds may be measured for the particularly identified software test suite 276a.

As another example, in an embodiment in which received general QoS requirements include a requirement for a minimum throughput (e.g., Gbit/s) for IO commands incoming from the host computer 270, the load-balancing agent 216 may reserve a certain number of back-end communication adapters (e.g., 245a or 245b), or a specific portion of fabric 212 for transmission of IO commands received from the host computer 270 in order to ensure that each of these IO commands are transmitted at a speed that meets these general QoS requirements for any software test suites 276a-276n. However, execution of a particularly identified software test suite 276a may not utilize all of the reserved certain number of back-end communication adapters (e.g., 245a or 245b), or a specific portion of fabric 212 for transmission of IO commands received from the host computer 270 during execution of a particularly identified software test suite. A portion of actually utilized number of these data center hardware resources to meet the minimum throughput requirements may be measured for the particularly identified software test suite 276a.

In yet another example, in an embodiment in which received general QoS requirements include a requirement for a minimum memory capacity for performing IO read/write commands incoming from the host computer 270, the load-balancing agent 216 may reserve a certain number of storage arrays (e.g., 250a or 250b) or managed drives (e.g., 251 252, 253, or 254) for performing of IO read/write commands received from the host computer 270 in order to ensure that each of these IO commands are handled at a speed that meets these general QoS requirements for any software test suites 276a-276n. However, execution of a particularly identified software test suite 276a may not utilize all of the reserved certain number of storage arrays (e.g., 250a or 250b) or managed drives (e.g., 251 252, 253, or 254) for performing of IO read/write commands received from the host computer 270 during execution of a particularly identified software test suite. A portion of actually utilized number of these data center hardware resources to meet the minimum memory capacity may be measured for the particularly identified software test suite 276a.

In another aspect of an embodiment, the load-balancing agent 216 operating at the data storage system/data center 210 in an embodiment may route incoming IO commands from the host computer 270 generally for any software test suites to various data center hardware components (e.g., 232, 240a, 240b, 241a, 241b, 242a, 242b, 243a, 243b, 244a, 244b, 245a, 245b, 211, 212, 250a, 250b, 251, 252, 253 or 254) of varying function in order to meet these general QoS requirements. For example, as described herein, certain back-end communication adapters (e.g., 245a or 245b), such as PCIe cards or ASIC cards may be dedicated to performance of specific tasks such as encryption, deduplication, or compression. In an embodiment in which received general QoS requirements include an ability to perform IO commands incoming from the host computer 270 for executing any of these specific tasks (e.g., encryption, deduplication, compression), the load-balancing agent 216 may reserve a certain number of back-end communication adapters (e.g., 245a or 245b) dedicated to performance any of such tasks for execution of IO commands received from the host computer 270 in order to ensure that each of these IO commands are executed in a way that meets these general QoS requirements for any software test suites. In various embodiments described herein, such load-balancing instructions may identify a percentage capacity of individual data center hardware components (e.g., 232, 240a, 240b, 241a, 241b, 242a, 242b, 243a, 243b, 244a, 244b, 245a, 245b, 211, 212, 250a, 250b, 251, 252, 253 or 254) or percentage capacity of overall data center hardware component groups (e.g., all memory resources, all processing resources, all fiber resources, all back-end communication adapter resources) dedicated to execution of software test suites pursuant to received general QoS requirements. However, execution of a particularly identified software test suite 276a may not utilize all of the reserved certain types or capacities of back-end communication adapters (e.g., 245a or 245b) dedicated to performance any of such various tasks for execution of IO commands received from the host computer 270 during execution of a particularly identified software test suite. A portion of actually utilized types or capacity of these data center hardware resources to meet the types of functions or necessary capacity of such functions may be measured for the particularly identified software test suite 276a.

As described herein, the general QoS requirements (e.g., guaranteed capacity, throughput, capped latency, processing speed, etc.) may apply to all portions or features of the software application being tested via host computer 270, or may apply to a particular customer (e.g., operator of host 270). However, the actual capacity of these data center hardware components (e.g., 232, 240a, 240b, 241a, 241b, 242a, 242b, 243a, 243b, 244a, 244b, 245a, 245b, 211, 212, 250a, 250b, 251, 252, 253 or 254) that will be utilized during testing of the software application via host testbed application such as any of the software test suites 276a-276n may vary depending on the particular feature of the software being tested at a given time.

Data center hardware component utilization rates may measure actual utilization for each of the data center hardware components (e.g., 232, 240a, 240b, 241a, 241b, 242a, 242b, 243a, 243b, 244a, 244b, 245a, 245b, 211, 212, 250a, 250b, 251, 252, 253 or 254) utilized during execution of a particularly identified software test suite, such as 276a, associated with a software test suite identifier such as 277a (e.g., testing for a particular feature of the software application under development via 270). In particular, such data center hardware component utilization rates may measure whether data center memory resources (e.g., 250a, 250b, 251, 252, 253, or 254), processing resources (e.g., 232, 240a, 240b, 240c, 242a, 242b) or data center back-end communication adapters (e.g., 245a or 245b) reserved by the load-balancing agent 216 pursuant to the general QoS requirements described above for software test suites 276a-276n were actually utilized during execution of a particularly identified software test suite 276a. In some embodiments, the data center hardware component utilization rates may distinguish between various types of data center hardware components. For example, the data center hardware component utilization rates may measure utilization of flash memory in comparison to non-volatile memory, CPUs in comparison to GPUs, or back-end communication adapters such as PCIe cards or ASIC cards dedicated to performance of encryption in comparison to deduplication or compression.

The execution of code instructions for the software test suite green data center policy generation system in an embodiment may train code instructions of a utilization forecasting engine to predict future hardware component utilization rates and execution durations for each particularly identified software test suite at block 304. For example, a software test suite green data center policy generation system 280 in an embodiment may use algorithmic code instructions for a time series utilization forecasting engine 286 that predicts a utilization rate for one or more data center hardware components or data center hardware component groups (e.g., all memory devices, all processors, all PCIe cards or other ASIC cards) within a data storage system/data center 210, based on previously recorded utilization rates for each of such hardware components/groups during execution of a particularly identified software test suite. The code instructions of the time series utilization forecasting engine 286 in an embodiment may be trained based on the data center operational telemetry measurements gathered by the green policy agent 219 over a training period as described above. For example, the utilization forecasting engine 286 operating at the UEM 200 may use the operational telemetry measurements gathered from the green policy agent 219 discussed directly above with respect to block 402 as inputs during a training period in order to predict utilization rates (e.g., between zero and 100 percent of reserved data center hardware component capacity) during execution of a particularly identified software test suite for one or more hardware components (e.g., 232, 240a, 240b, 241a, 241b, 242a, 242b, 243a, 243b, 244a, 244b, 245a, 245b, 211, 212, 250a, 250b, 251, 252, 253 or 254) or one or more groups of hardware components (e.g., memory devices 250a, 250b, 251, 252, 253, 254, processors 242a or 242b, or various PCIe cards or other ASIC cards connecting one of a plurality of processors to one of a plurality of memory devices via fabric 212). Thus, the predicted utilization rates are predicted based on previous utilization rates for those hardware components or hardware component groups and on load-balancing instructions for reserving a certain capacity of these hardware components/groups pursuant to generalized QoS requirements for all software test suites as well as measure data center hardware capacity utilization rates measured for particularly identified software test suites. The utilization forecasting engine 286 in an embodiment may execute code instructions for any of several time series forecasting algorithms or models known in the art, including an autoregressive integrated moving average (AMIRA) time series forecasting model.

At block 306, execution of code instructions of the software test suite green data center policy generating system may generate a green data center policy for a particularly identified software test suite. In a specific example, the trained utilization forecasting engine 286 in an embodiment may predict that execution of a particularly identified software test suite will take one hour and will utilize 40% of reserved fabric 212 resources, 30% of reserved memory resources, and 50% of reserved processing resources as reserved by the load-balancing agent 216 for execution of the particularly identified software test suite. As another example, the utilization forecasting engine 286 in an embodiment may predict that none of the memory resources or back-end communication adapters (e.g., PCIe or ASIC cards) that are dedicated to compression or encryption tasks and that have been reserved for execution of the particularly identified software test suite will actually be utilized. This may be the case, for example, if the particularly identified software test suite is testing only the deduplication capabilities of the software application under development. In other example embodiments, the trained utilization forecasting engine 286 may predict that none of the memory resources or back-end communication adapters (e.g., PCIe or ASIC cards) that are dedicated to deduplication tasks or other IO command tasks and that have been reserved for execution of the particularly identified software test suite will actually be utilized.

At block 306, the software test suite green data center policy generation system in an embodiment may execute code instructions of a software test suite green data center policy generation system to generate the green data center policy specific to the particularly identified software test suite based on the above predicted utilization capacity to decrease data center hardware component capacity over-allocated for execution of the particularly identified software test suite. Such a green data center policy in an example embodiment may include an instruction to maintain power to the percentage of data center hardware component resources reserved by the load-balancing agent 216 for execution of the particularly identified software test suite that are predicted to actually be utilized during execution of that specific software test suite for the predicted duration of the software test suite. For example, such a green data center policy may include an instruction to reserve and power on 40% of fabric 212 resources, 30% of memory resources, and 50% of processing resources reserved by the load-balancing agent 216 for execution of the particularly identified software test suite during the predicted one hour duration of the software test suite execution. The green data center policy in such an example embodiment may also include an instruction to power down or throttle power supplied to 60% of fabric 212 resources (e.g., allowing 40% to remain fully powered), 70% of memory resources (e.g., allowing 30% to remain fully powered), and 50% of processing resources (e.g., allowing 50% to remain fully powered) reserved by the load-balancing agent 216 for execution of the particularly identified software test suite during the predicted one hour duration of the software test suite execution.

In another embodiment, a green data center policy may include an instruction to maintain power to only specific types of data center hardware component resources reserved by the load-balancing agent 216 for execution of the particularly identified software test suite that are predicted to actually be utilized during execution of that particularly identified software test suite for the predicted duration of the software test suite execution. For example, such a green data center policy may include an instruction to reserve and power on memory resources or back-end communication adapters (e.g., PCIe cards, ASIC cards) dedicated to performance of specific tasks. More specifically, such a green data center policy may include an instruction to maintain power to memory resources or PCIe/ASIC cards dedicated to or capable of (e.g., not dedicated to a particular task) performance of deduplication tasks. The green data center policy in such an example embodiment may also include an instruction to power down or throttle power supplied to memory resources or PCIe/ASIC cards dedicated to execution of other tasks (e.g., compression, encryption) otherwise reserved by the load-balancing agent 216 upon execution of the particularly identified software test suite during the predicted one hour duration of the software test suite execution. For example, the green data center policy in such an example embodiment may also include an instruction to power down or throttle power supplied to memory resources or PCIe/ASIC cards dedicated to execution of encryption tasks (e.g., 15% of memory resources and 20% of PCIe/ASIC cards) and dedicated to execution of compression tasks (e.g., 20% of memory resources and 30% of PCIe/ASIC cards) for execution of the particularly identified software test suite during the predicted one hour duration of the software test suite execution that is less than that reserved pursuant to general QoS requirements for any of a plurality of software test suites.

The software test suite green data center policy generation system in an embodiment may transmit the green data center policy for the particularly identified software test suite to the green policy agent for execution at the data storage system/data center during future execution of the particularly identified software test suite at block 308. For example, the software test suite green data center policy generation system 280 in an embodiment may transmit the green data center policies described directly above with respect to block 306 that are associated with the particularly identified software test suite via its software test suite identifier to the green policy agent 219 at the data storage system/data center 210 for implementation. In such a way, the green data center policy generated by the software test suite green data center policy generation system 280 may instruct the green policy agent 219 to lower power consumed by 60% of fabric 212 resources, 70% of memory resources, and 50% of processor resources during the one hour execution of the particularly identified software test suite while still meeting actual capacity and performance requirements in a first example embodiment. Additionally, in a second example embodiment, in such a way, the green data center policy generated by the software test suite green data center policy generation system 280 may instruct the green policy agent 219 to lower power consumed by data center memory hardware components (e.g., 35% of all data center memory hardware components) and back-end communication adapters (e.g., 50% of all PCIe/ASIC cards) during the one hour execution of the particularly identified software test suite while still meeting actual capacity and performance requirements for such an execution. The method for training and using a utilization forecasting engine to predict a utilization capacity for various data center hardware components required for execution of a particularly identified software test suite from among a plurality of software test suites may then end.

Figure 4:
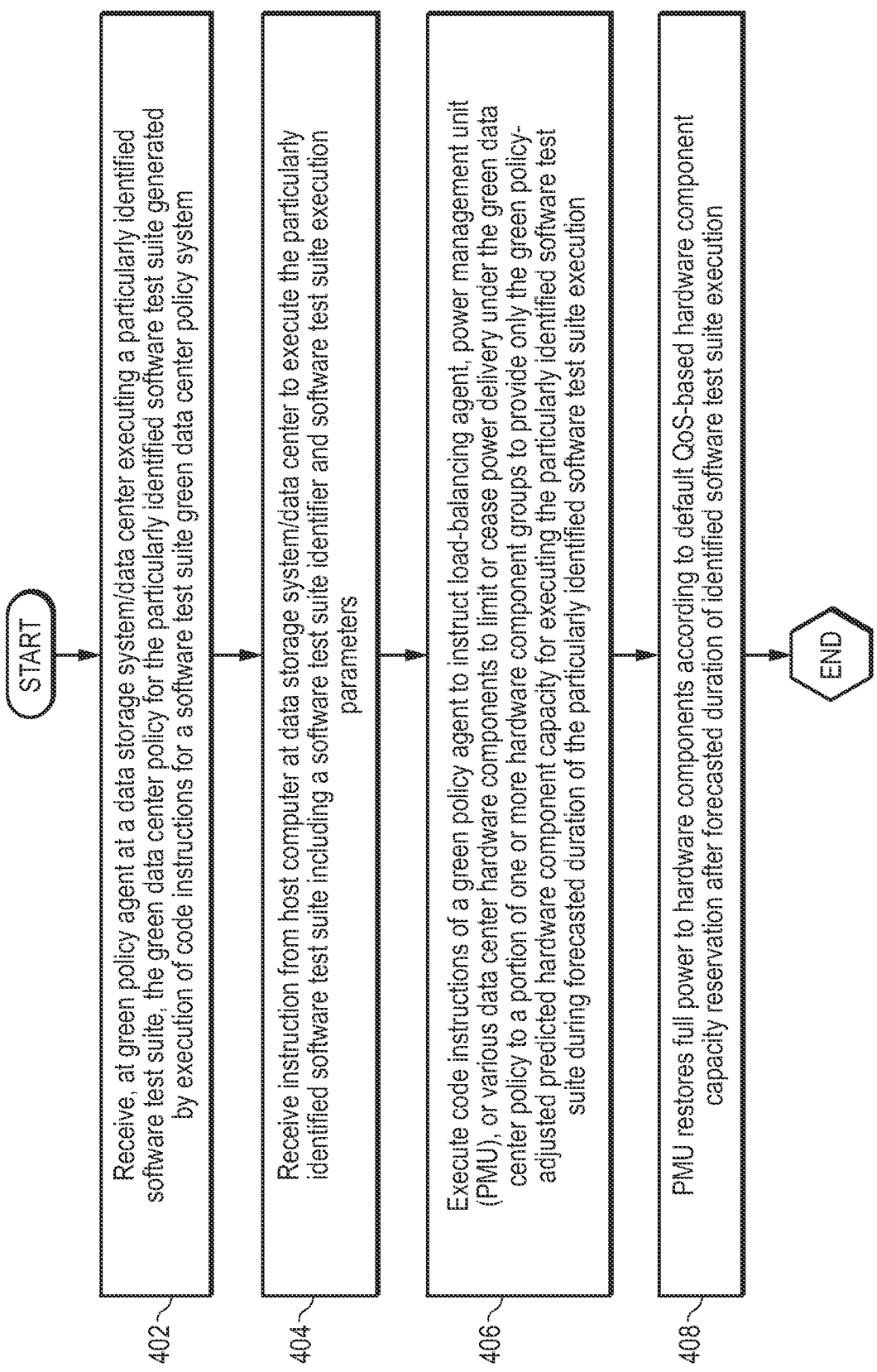
FIG. 4 is a flow diagram illustrating a method of throttling power delivered to over-allocated data center hardware components reserved for execution of a test suite but predicted to be underutilized during such execution according to an embodiment of the present disclosure.

FIG. 4 is a flow diagram illustrating a method of throttling power delivered to data center hardware components generally reserved for execution of a software test suite pursuant to generalized QoS requirements and predicted by a green data center policy tailored to a particularly identified software test suite to be underutilized during such execution according to an embodiment of the present disclosure. As described herein, execution of code instructions of a software test suite green data center policy generation system utilized a trained time series utilization forecasting engine to predict utilization capacities for a particularly identified software test suite and its software test suite execution parameters for an upcoming execution to generate a green data center policy. In an embodiment, the green data center policy may be transmitted for the particularly identified software test suite, based on its software test suite identifier, to a green policy agent for execution at the data storage system/data center during the future execution of the particularly identified software test suite and with any received software test suite execution parameters.

At block 402, a processor processing resources at a data storage system/data center executing code instructions of the green policy agent in an embodiment may receive one or more green data center policies generated by the software test suite green data center policy generation system for tailoring a capacity for various data center hardware components or groups reserved during execution of software test suites generally to the predicted utilization rates of a particularly identified software test suite and its software test suite execution parameters. For example, in an embodiment described with reference to FIG. 2, the green policy agent 219 operating at the data storage system/data center 210 may receive one or more green data center policies generated by the software test suite green data center policy generation system 280 at the UEM platform 200. Each of these green data center policies in an embodiment may be specifically tailored to an individual software test suite identified by a software test suite identifier during previous executions for training the software test suite green data center policy generation system 280 at the UEM platform information handling system 200. More specifically, the green policy agent 219 in such an embodiment may receive green data center policies transmitted by the software test suite green data center policy generation system 280 including instructions as described in greater detail above with respect to block 308. The green policy agent 219 in an embodiment may store the received test-suite specific green data center policies for one or more particularly identified software test suites scheduled to be executed in various memory hardware components (e.g., 243*a*, 243*b*, 211, 250*a*, 250*b*, 251, 252, 253, or 254) of the data storage system/data center.

The data storage system/data center in an embodiment may receive an instruction at block 404 from a host computer to execute a particularly identified software test suite associated with a software test suite identifier and its software test suite parameters according to embodiments herein. For example, upon later execution of the particularly identified software test suite 276*a* identified by its software test suite identifier 277*a* in an embodiment, a compute node (e.g., 240*a*) may receive IO commands from the host computer 270 instructing execution of the particularly identified software test suite 276*a*. The software test suite identifier may be an index number, code, metadata identifier, or other type of specific identifier within IO commands initiating execution of the particularly identified software test suite 276a. The compute node (e.g., 240a) in such an embodiment may execute code instructions to notify the green policy agent 219 that the host computer 270 is initiating execution of the particularly identified software test suite 276a and any software test suite execution parameters required for execution. The green policy agent 219 in an embodiment may execute code instructions to receive and identify the green data center policy associated with the particularly identified software test suite, as generated and received from the software test suite green data center policy generation system 280 according to embodiments herein.

At block 406, the execution of code instructions of the green policy agent in an embodiment may instruct the load-balancing agent, power management unit (PMU) or various data center hardware components to limit or cease power delivery to a portion of one or more hardware components groups to provide only the green-policy adjusted hardware component capacity of that portion of data center hardware resources for execution of the particularly identified software test suite during the forecasted duration of execution of the particularly identified software test suite from the capacity otherwise reserved generally for QoS requirements of any software test suite types. For example, in an embodiment in which the green data center policy associated with the particularly identified software test suite includes an instruction to maintain power to a certain percentage of specifically identified data center hardware components (e.g., 232, 240a, 240b, 241a, 241b, 242a, 242b, 243a, 243b, 244a, 244b, 245a, 245b, 211, 212, 250a, 250b, 251, 252, 253 or 254) or data center hardware component groups (e.g., memory resources, processing resources, fabric resources, or back-end communication adapter resources) from that otherwise reserved pursuant to generalize QoS requirements for software test suites, the green policy agent 219 may execute code instructions to transmit an instruction to the load-balancing agent 216 to route incoming IO commands to only those data center hardware components or groups set to remain powered on for execution of the particularly identified software test suite 276a.

In another example embodiment in which the green data center policy associated with the particularly identified software test suite 276a includes an instruction to maintain power to specific types of data center hardware components (e.g., memory resources or PCIe/ASIC cards dedicated to specific tasks like deduplication), the green policy agent 219 may execute code instructions to transmit an instruction to the load-balancing agent 216 to route incoming IO commands to only those data center hardware components set to remain powered on rather than to those reserved data center hardware components that are predicted to be underutilized by the execution of the particularly identified software test suite 276a. The load-balancing agent 216 in such embodiments may then execute the received instructions from the green policy agent 219 in lieu of or in addition to load-balancing instructions generated by the load-balancing agent 216 pursuant to received general QoS requirements. In such a way, the green policy agent 219 in an embodiment may override generalized QoS requirements to tailor capacity reservation for various data center hardware components to the capacity that is predicted to actually be used during execution of a particularly identified software test suite.

In yet another example embodiment in which the green data center policy associated with the particularly identified software test suite includes an instruction to throttle power to a certain percentage of specifically identified data center hardware components (e.g., 232, 240a, 240b, 241a, 241b, 242a, 242b, 243a. 243b, 244a, 244b, 245a, 245b, 211, 212, 250a, 250b, 251, 252, 253 or 254) or data center hardware component groups (e.g., memory resources, processing resources, fabric resources, or back-end communication adapter resources), the green policy agent 219 may execute code instructions to transmit an instruction to those data center hardware components or groups to enter an idle or sleep mode, or may transmit an instruction directly to the PMU 218 to throttle power supplied to those components. These components are predicted to be underutilized by the green data center policy received and thus an overallocated portion of the reserved data center hardware resources generally reserved for any software test suites. It is unnecessary to consume power and generate CO2 by powering them during execution of a particularly identified software test suite 276a from among a plurality of software test suites 276a-276n.

In still another example embodiment in which the green data center policy associated with the particularly identified software test suite includes an instruction to throttle power to specific types of data center hardware components (e.g., memory resources or PCIe/ASIC cards dedicated to specific tasks like encryption or compression), the green policy agent 219 may execute code instructions to transmit an instruction to those particular data center hardware components to enter an idle mode or sleep mode, or may transmit an instruction directly to the PMU 218 to throttle power supplied to those components. These components are predicted to be underutilized by the green data center policy received and thus an overallocated portion of the reserved data center hardware resources generally reserved for any software test suites. It is unnecessary to consume power and generate CO2 by powering them during execution of a particularly identified software test suite 276a from among a plurality of software test suites 276a-276n.

In still other example embodiments, the green policy agent 219 may execute code instructions to transmit an instruction to the load-balancing agent 216 to instruct the PMU 218 to throttle power supplied to any data center hardware components to which incoming IO commands from the host computer will not be routed during execution of a particularly identified software test suite. The load-balancing agent 216, PMU 218, or data center hardware components in such embodiments may then execute the received instructions from the green policy agent 219 in lieu of or in addition to load-balancing instructions generated by the load-balancing agent 216 pursuant to received QoS requirements. Thus, these components that are predicted to be underutilized or not used by the green data center policy may be paused from consuming power and generating CO2 by powering them during execution of a particularly identified software test suite 276a from among a plurality of software test suites 276a-276n.

The PMU in an embodiment may restore full power to any data center hardware components powered down pursuant to the green data center policy after the predicted execution duration for the particularly identified software test suite at block 408. For example, following the predicted duration of execution for the software test suite, the PMU 218 may restore power to any data center hardware components powered down pursuant to such an instruction. In such a way, the green policy agent 219 in an embodiment may override generalized QoS requirements to power down or throttle power supplied to data center hardware components over allocated and that are not predicted to actually be used during execution of a particularly identified software test suite to save power and reduce CO2 generation. The method for throttling power delivered to overallocated portions of data center hardware components reserved for execution of software test suites pursuant to generalized QoS requirements as predicted by a green data center policy tailored to a particularly identified software test suite during execution may then end.

The blocks of the flow diagrams of FIGS. 3, and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing a software test suite green data center policy generation system comprising:
   a network interface device receiving data center operational telemetry measurements for a plurality of data center processors forming a data center processing system, including data center hardware utilization and performance analytics during execution of a software test suite at a data center, and a software test suite identifier for the software test suite;
   a hardware processor executing code instructions of the software test suite green data center policy generation system to identify a reserved capacity of the data center processing system reserved at the data center for execution of software test suites according to general quality of service (QoS) requirements for input/output (IO) commands directed to the data center processing system during execution of the software test suites;
   the hardware processor executing code instructions of a forecasting engine to predict a future data center processor utilization rate and a software test suite execution duration for the software test suite identified with the software test suite identifier, where predicted future data center utilization yields a forecasted capacity of the data center processing system that is less than the reserved capacity of the data center processing system for general execution of software test suites; and
   the network interface device transmitting an instruction to the data center to throttle power supplied to an over-allocated portion of the reserved capacity of the data center processing system when a portion of the reserved capacity exceeds the forecasted capacity for the software test suite identified with the software test suite identifier for the forecasted execution duration.

2. The information handling system of claim 1, wherein the over-allocated portion of the reserved capacity of the data center processing system is dedicated to execution of compression tasks.

3. The information handling system of claim 1, wherein the over-allocated portion of the reserved capacity of the data center processing system is a data center processing engine.

4. The information handling system of claim 1, wherein the over-allocated portion of the reserved capacity of the data center processing system is a data center computing node.

5. The information handling system of claim 1, wherein the over-allocated portion of the reserved capacity of the data center processing system is a central processing unit (CPU).

6. The information handling system of claim 1, wherein the over-allocated portion of the reserved capacity of the data center processing system is a graphics processing unit (GPU).

7. The information handling system of claim 1, wherein the data center processing system is located at a plurality of data centers and the over-allocated portion of the reserved capacity of the data center processing system is located at one of the plurality of data centers.

8. A software test suite green data center policy generation method comprising:
   receiving data center operational telemetry measurements, via a network interface device, for a plurality of data center memory hardware components, including data center hardware utilization analytics during execution of a selected software test suite at the data center, and a software test suite identifier for the selected software test suite selected from a plurality of software test suites available to a user;
   executing code instructions, via a hardware processor, to identify a reserved capacity of the plurality of data center memory hardware components reserved at a data center for a previous execution of software test suites according to general quality of service (QoS) requirements for input/output (IO) commands directed to the data center memory hardware components during execution of the plurality of software test suites;
   executing code instructions, via the hardware processor, of a forecasting engine to predict a future data center memory utilization rate based on expected IO commands to be executed during the selected software test suite and to predict execution duration for the selected software test suite identified with the software test suite identifier from the received data center operational telemetry, where predicted future data center memory utilization rate yields a forecasted capacity required of the data center memory capacity components for execution of the selected software test suite that is less than the reserved capacity of the data center processing system for general execution of the plurality of software test suites; and transmitting an instruction, via the network interface device, to the data center to throttle power supplied to an over-allocated portion of the plurality of data center memory hardware components when a portion of the reserved capacity exceeds the forecasted capacity of the data center memory hardware components for the selected software test suite identified with the software test suite identifier during the forecasted software test suit execution duration.

9. The method of claim 8, wherein the over-allocated portion of the reserved capacity of the plurality of data center memory hardware components are dedicated to execution of deduplication tasks.

10. The method of claim 8, wherein the over-allocated portion of the reserved capacity of the plurality of data center memory hardware components are dedicated to execution of encryption tasks.

11. The method of claim 8, wherein the over-allocated portion of the reserved capacity of the plurality of data center memory hardware components includes one or more data storage arrays.

12. The method of claim 8, wherein the over-allocated portion of the reserved capacity of the plurality of data center memory hardware components includes one or more managed drives.

13. The method of claim 8, wherein the over-allocated portion of the reserved capacity of the plurality of data center memory hardware components includes one or more dynamic random access memory hardware components.

14. The method of claim 8, wherein the over-allocated portion of the reserved capacity of the plurality of data center memory hardware components includes one or more flash memory devices.

15. An information handling system executing a software test suite green data center policy generation system comprising:

a network interface device receiving operational data center telemetry measurements for a plurality of data center computing node back-end communication adapters, including data center hardware utilization analytics during execution of a selected software test suite at a data center, and a software test suite identifier for the selected software test suite selected from a plurality of software test suites available to a user;

a hardware processor executing code instructions of the software test suite green data center policy generation system to identify a reserved capacity of the plurality of data center computing node back-end communication adapters reserved at the data center for a previous execution of software test suites according to general quality of service (QoS) requirements for input/output (IO) commands directed to the data center during execution of the plurality of software test suites;

the hardware processor executing code instructions of a forecasting engine to predict a future utilization rate for the plurality of data center computing node back-end communication adapters and execution duration for the selected software test suite from the received data center operational telemetry, where predicted future utilization rate of the plurality of data center computing node back-end communication adapters yields a forecasted capacity required for execution of the selected software test suite that is less than the reserved capacity of the plurality of data center computing node back-end communication adapters for general execution of the plurality of software test suites; and the network interface device transmitting an instruction to the data center to throttle power supplied to an over-allocated portion of the reserved capacity of the plurality of data center computing node back-end communication adapters when a portion of the reserved capacity exceeds the forecasted capacity of the plurality of data center computing node back-end communication adapters for the selected software test suite identified with the software test suite identifier during the forecasted software test suit execution duration.

16. The information handling system of claim 15, wherein the plurality of data center computing node back-end communication adapters are Application Specific Integrated Circuit (ASIC) cards.

17. The information handling system of claim 15, wherein the over-allocated portion of the reserved capacity of the plurality of data center computing node back-end communication adapters are dedicated to execution of deduplication tasks.

18. The information handling system of claim 15, wherein the over-allocated portion of the reserved capacity of the plurality of data center computing node back-end communication adapters are dedicated to execution of encryption tasks.

19. The information handling system of claim 15, wherein the over-allocated portion of the reserved capacity of the plurality of data center computing node back-end communication adapters are dedicated to execution of compression tasks.

20. The information handling system of claim 15, wherein the plurality of data center computing node back-end communication adapters are peripheral component interface express (PCIe) cards.

* * * * *